（12) United States Patent
Wilmhoff et al.

(10) Patent No.: US 9,843,089 B2
(45) Date of Patent: Dec. 12, 2017

(54) PORTABLE ANTENNA

(71) Applicant: BluFlux RF Technologies, LLC, Louisville, CO (US)

(72) Inventors: Benjamin Russell Wilmhoff, Boulder, CO (US); Gary Andrew Rayner, Henderson, NV (US); Aaron Rogers Finch, Steamboat Springs, CO (US); Andrew David Rowser, Boulder, CO (US)

(73) Assignee: BLUFLUX RF TECHNOLOGIES, LLC, Louisville, CO (US)

( * ) Notice: Subject to any disclaimer, the term of this patent is extended or adjusted under 35 U.S.C. 154(b) by 271 days.

(21) Appl. No.: 14/499,091

(22) Filed: Sep. 27, 2014

(65) Prior Publication Data

US 2015/0094104 A1 Apr. 2, 2015

Related U.S. Application Data

(60) Provisional application No. 61/883,255, filed on Sep. 27, 2013.

(51) Int. Cl.
*H01Q 19/10* (2006.01)
*H01Q 1/24* (2006.01)
*H01Q 1/08* (2006.01)
*H04M 1/04* (2006.01)

(52) U.S. Cl.
CPC ............. *H01Q 1/241* (2013.01); *H01Q 1/08* (2013.01); *H01Q 1/084* (2013.01); *H01Q 19/10* (2013.01); *H04M 1/04* (2013.01)

(58) Field of Classification Search
CPC ......... H01Q 1/241; H01Q 19/10; H04M 1/04; H04W 64/003
USPC .................. 343/702, 781 CA, 834, 836, 840
See application file for complete search history.

(56) References Cited

U.S. PATENT DOCUMENTS

| 5,528,250 | A | * | 6/1996 | Sherwood | ................ | H01Q 3/08 |
| | | | | | | 343/711 |
| 7,079,079 | B2 | * | 7/2006 | Jo | ......................... | H01Q 1/243 |
| | | | | | | 343/700 MS |
| 7,764,236 | B2 | * | 7/2010 | Hill | ......................... | H01Q 1/243 |
| | | | | | | 343/702 |
| 2004/0196207 | A1 | * | 10/2004 | Schefter | ............... | H01Q 1/1235 |
| | | | | | | 343/878 |

(Continued)

*Primary Examiner* — Dameon E Levi
*Assistant Examiner* — Hasan Islam
(74) *Attorney, Agent, or Firm* — pkalousek.ip

(57) ABSTRACT

A portable antenna for wireless communication, the portable antenna comprising: an electromagnetically reflective material; a first mechanical structure supporting preferred shape of the electromagnetically reflective material when in deployed position; a second mechanical structure attached to at least one point on the preferred shape and adjustable to hold a mobile wireless communication device at a preferred position relative to the preferred shape, is claimed. Additionally disclosed is a system comprising the portable antenna wherein the second mechanical structure is adapted to hold a feed instead of a mobile device and a cover for a mobile wireless communication device, comprising a signal coupling mechanism, and a signal routing means, and wherein the a signal routing means is coupled to the feed.

16 Claims, 16 Drawing Sheets

(56) References Cited

U.S. PATENT DOCUMENTS

| | | | |
|---|---|---|---|
| 2006/0187137 A1* | 8/2006 | Waltman | H01Q 19/132 343/840 |
| 2007/0001920 A1* | 1/2007 | Webb | H01Q 1/08 343/766 |

* cited by examiner

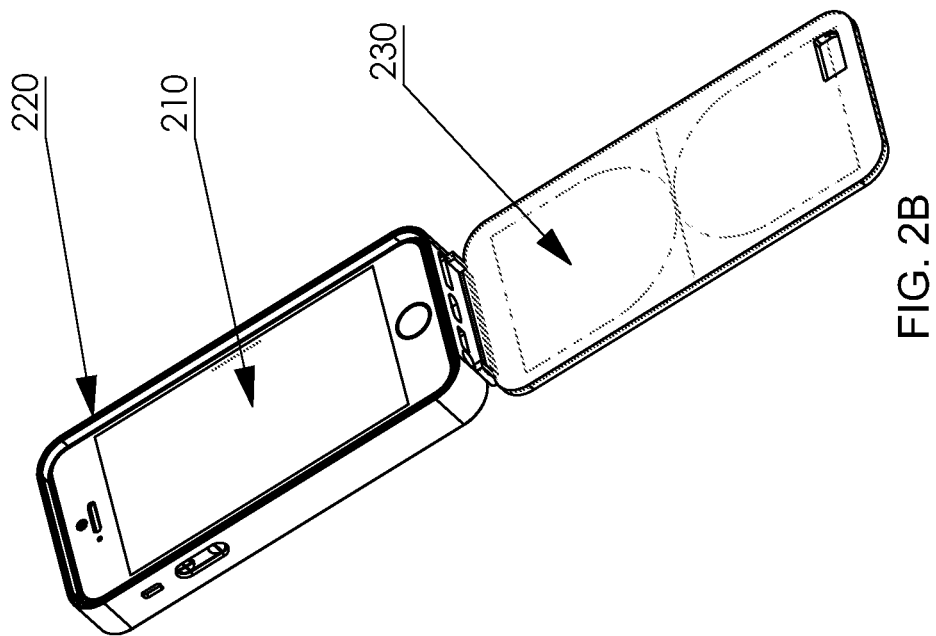
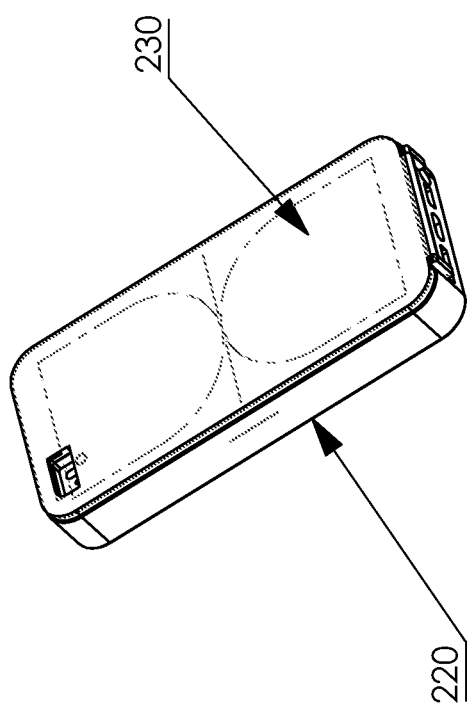
FIG. 2B
FIG. 2A

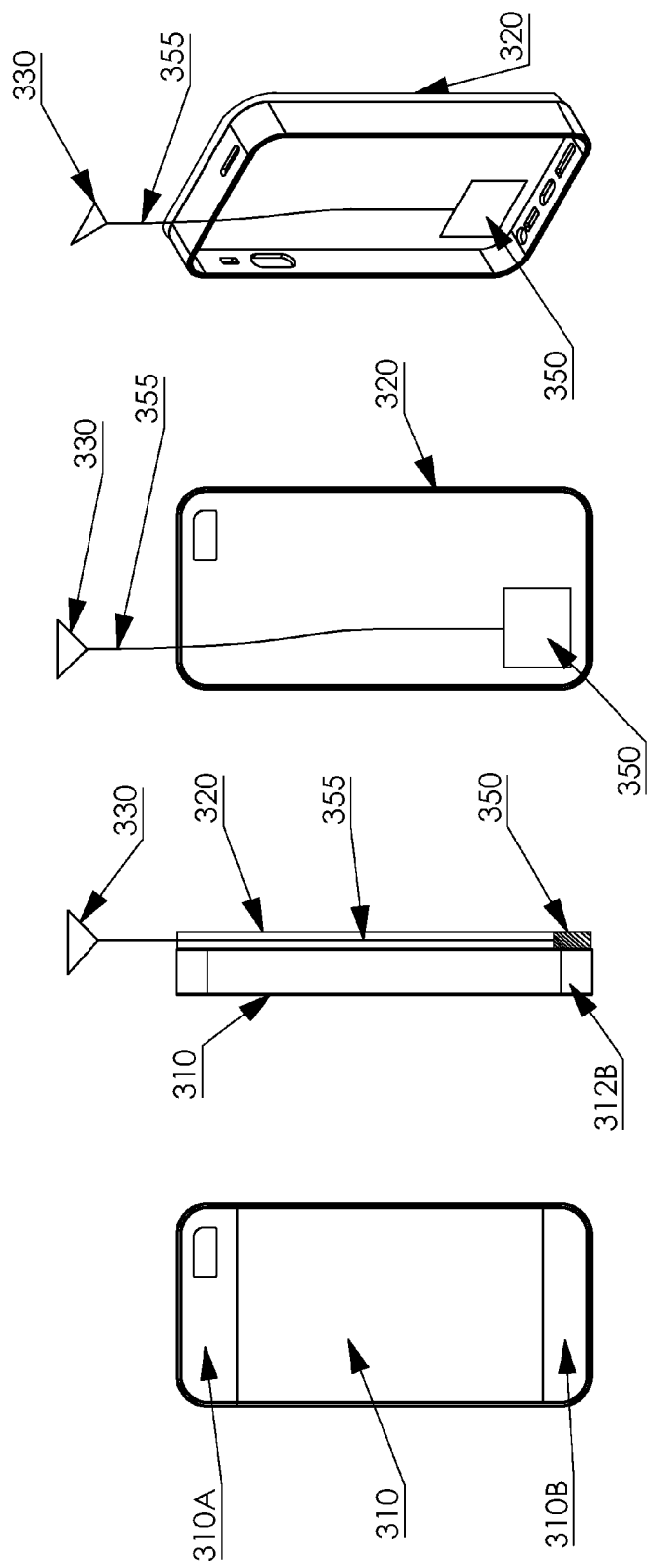

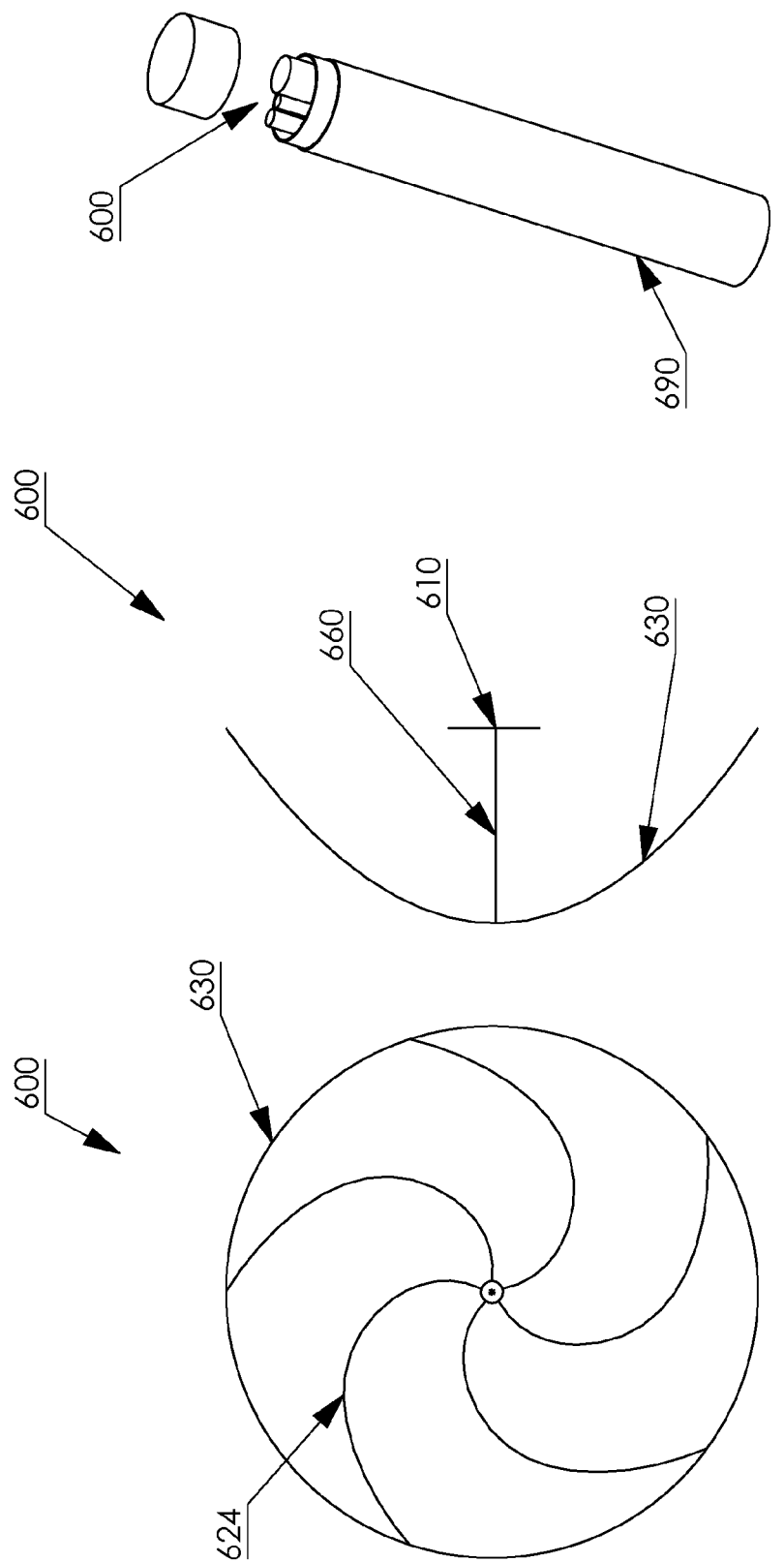

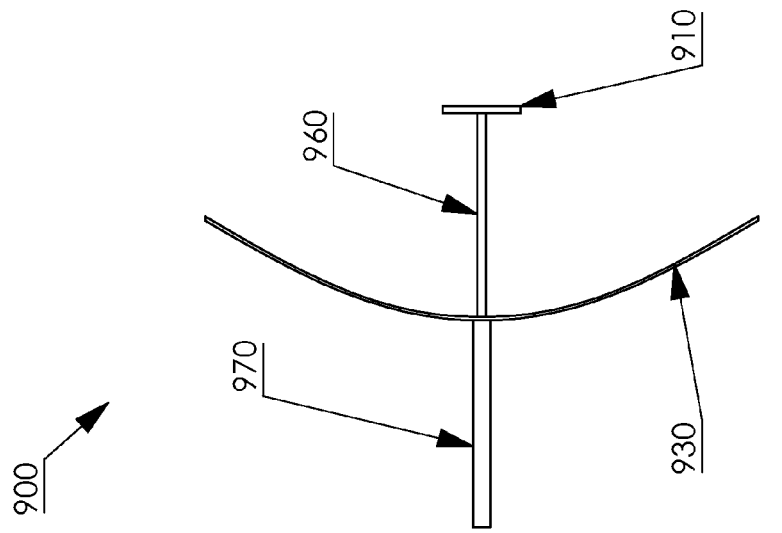
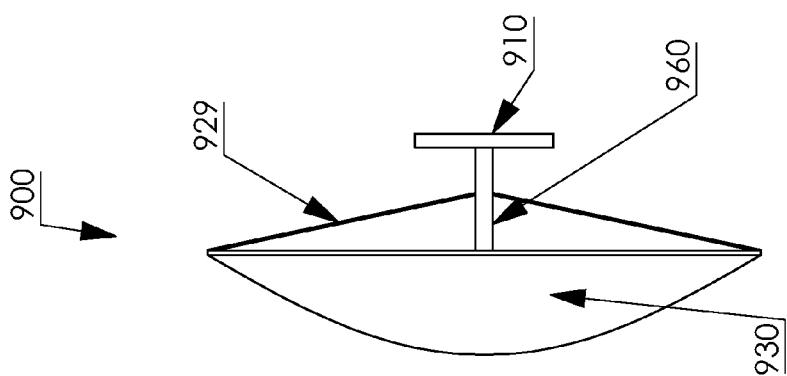
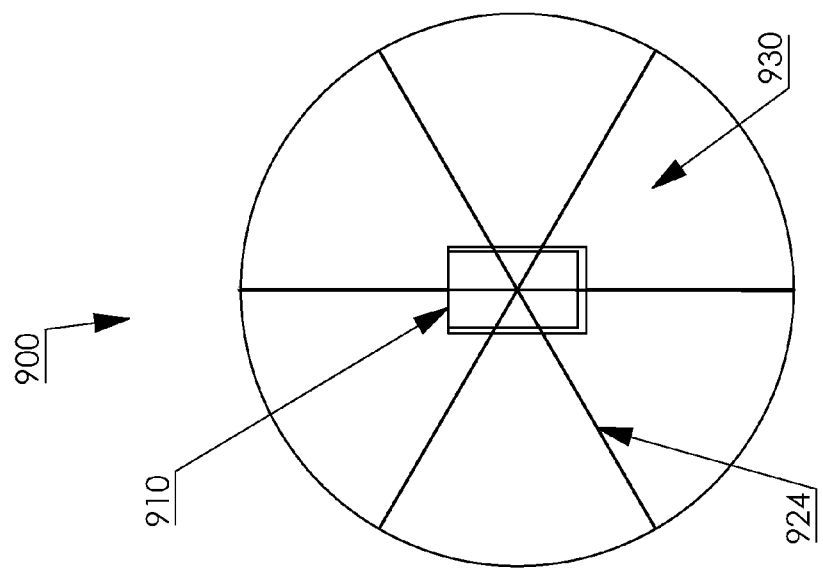

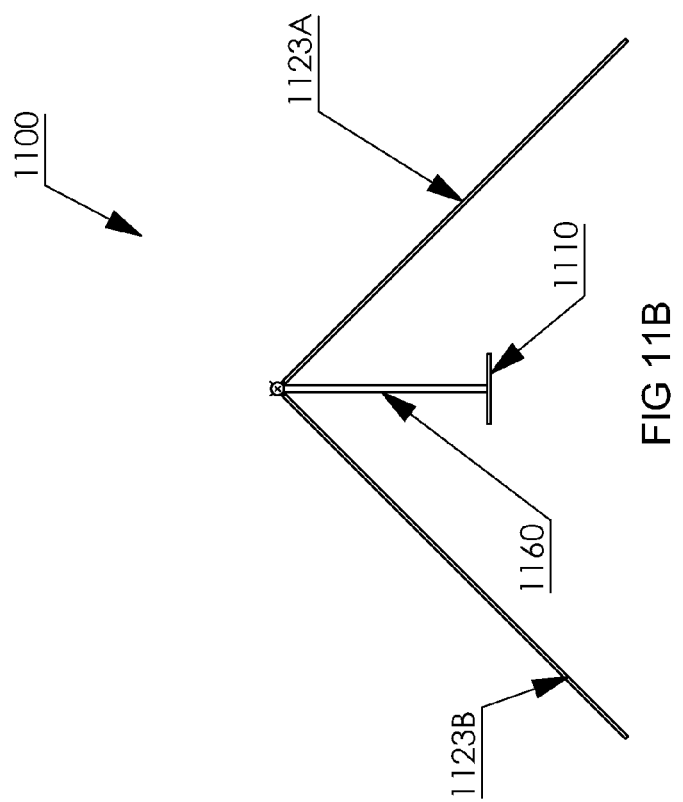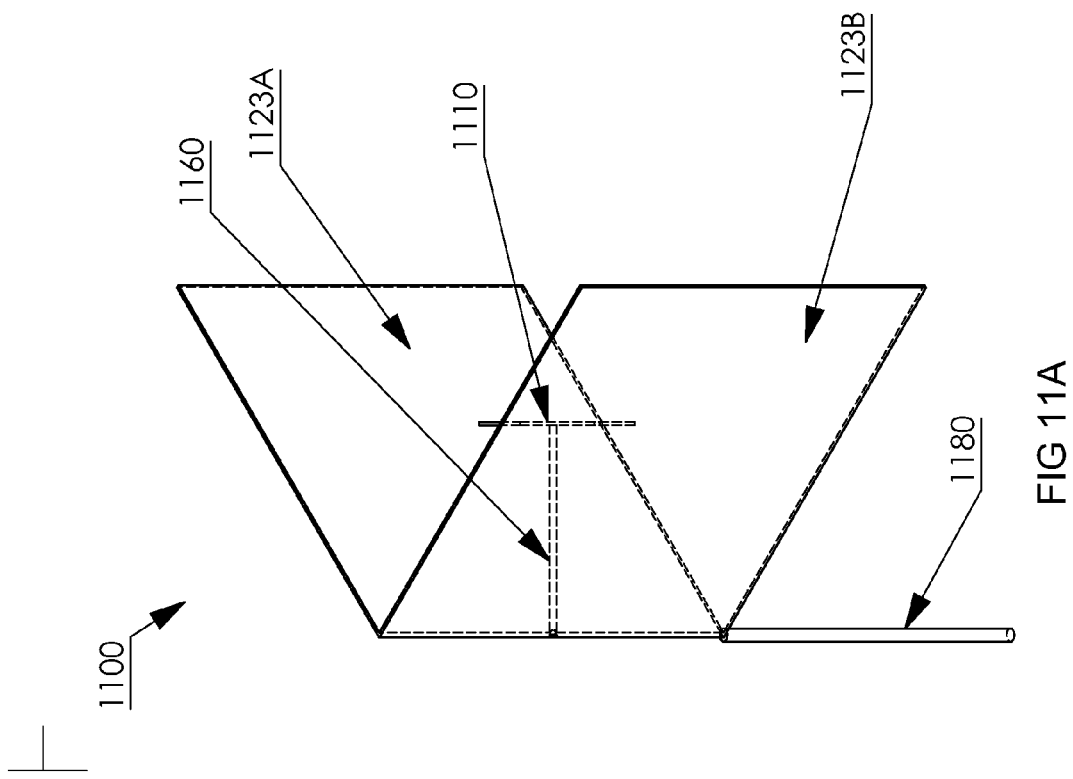

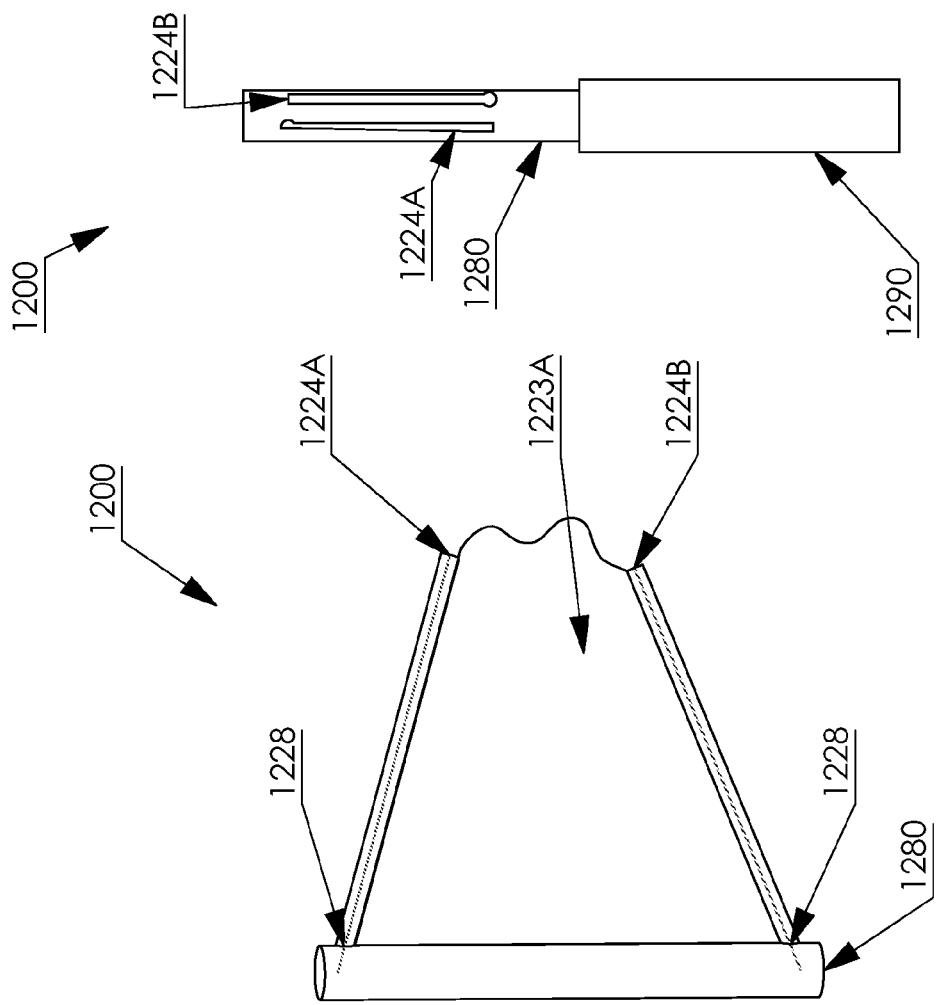
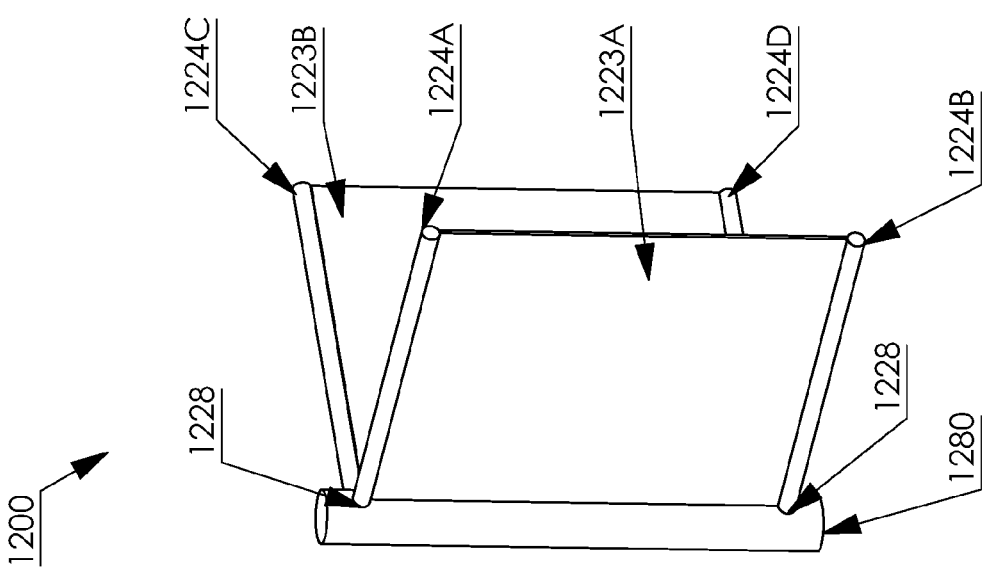

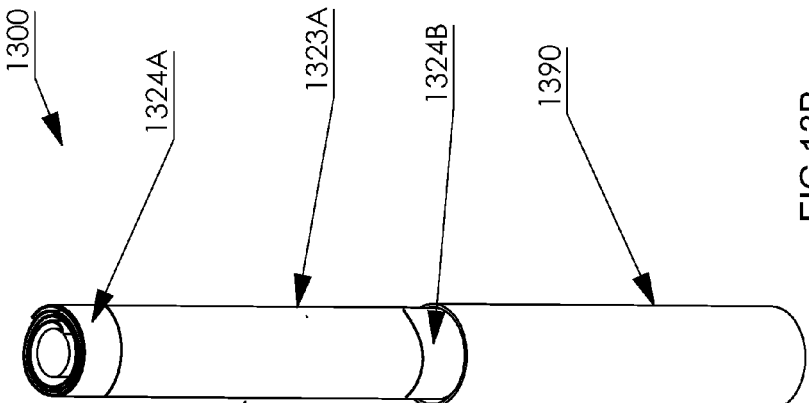
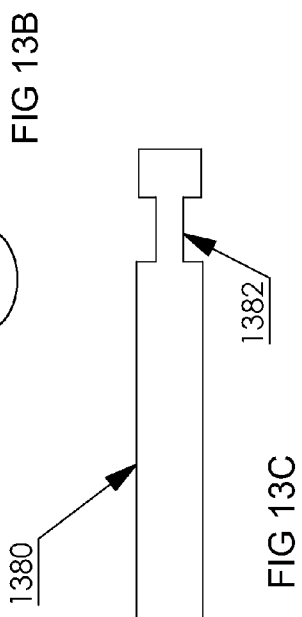
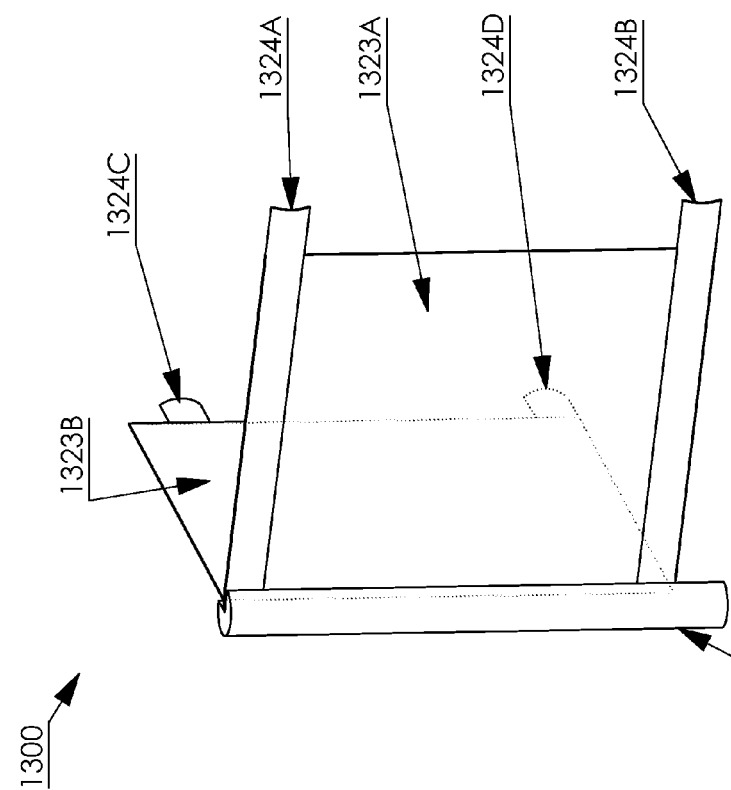
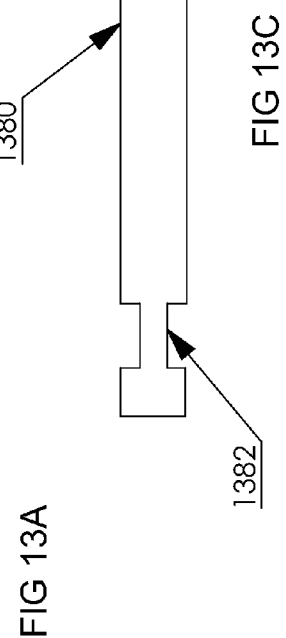
FIG 13B
FIG 13C
FIG 13A

PORTABLE ANTENNA

CROSS-REFERENCE TO RELATED APPLICATIONS

This application claims priority to U.S. Patent Application No. 61/883,255, filed Sep. 27, 2013, incorporated hereby by reference in its entirety.

FIELD

The present application relates to an antenna for a mobile electronic communication device.

BACKGROUND

Electronic devices are commonly used for communication and entertainment purposes. Examples of electronic devices include cellular phones, smart phones, tablet computers, audio players, video players, cameras, portable computers, two-way radios, mobile hotspots, Global Positioning System (GPS) receivers, and other electronic devices known to a person of ordinary skill in the art. Many of these devices communicate with other devices or systems through wireless communication. As reliance upon these types of electronic devices increases, reliance upon wireless communication also increases. While the coverage provided by wireless networks and systems has improved over time, there are still many geographic areas that have no coverage or marginal coverage. In remote areas, coverage is often marginal or spotty. Wireless service providers do not have a big incentive to provide improved coverage in many remote areas because the population and/or number of users in these areas is small and the financial return on infrastructure investments in these areas may not be attractive. However, the ability to communicate wirelessly from these types of areas may be very important in emergency or other urgent situations. In addition, even in areas which generally have good wireless coverage, wireless communications can be difficult due to various other problems such as dead spots, interference, reflections, system failures, and/or device deficiencies.

BRIEF DESCRIPTION OF THE DRAWINGS

The techniques disclosed herein will be described and explained through the use of the accompanying drawings in which:

FIG. 2A illustrates a perspective view of a case having an antenna in stowed position;

FIG. 2B illustrates a perspective view of the case having the antenna in deployed position;

FIG. 3A illustrates a front view of an electronic device indicating areas where internal antenna(s) are typically mounted;

FIG. 3B illustrates a side view of case having an external antenna, installed on the electronic device;

FIG. 3C illustrates a rear view of the case having an external antenna, installed on the electronic device;

FIG. 3D illustrates a perspective view of the case having an external antenna.

FIG. 6A illustrates a front view of a collapsible antenna;

FIG. 6B illustrates a side view of the collapsible antenna;

FIG. 6C illustrates the collapsible antenna in a transportable container;

FIG. 9A illustrates a front view of a deployable antenna;

FIG. 9B illustrates a side view of the deployable antenna;

FIG. 9C illustrates an side view of alternate configuration of the deployable antenna;

FIG. 11A illustrates a perspective view of a corner reflecting antenna;

FIG. 11B illustrates a top view of the corner reflecting antenna;

FIG. 12A illustrates a perspective view of a corner reflecting antenna having flexible reflecting surfaces in a deployed configuration;

FIG. 12B illustrates the corner reflecting antenna in a partially dismantled configuration;

FIG. 12C illustrates the corner reflecting antenna with a storage container;

FIG. 13A illustrates a perspective view of a corner reflecting antenna;

FIG. 13B illustrates the corner reflecting antenna with a storage container;

FIG. 13C illustrates a component of the corner reflecting antenna;

FIG. 14B illustrates a top view of the wire-based corner reflector of;

Figure 1C:
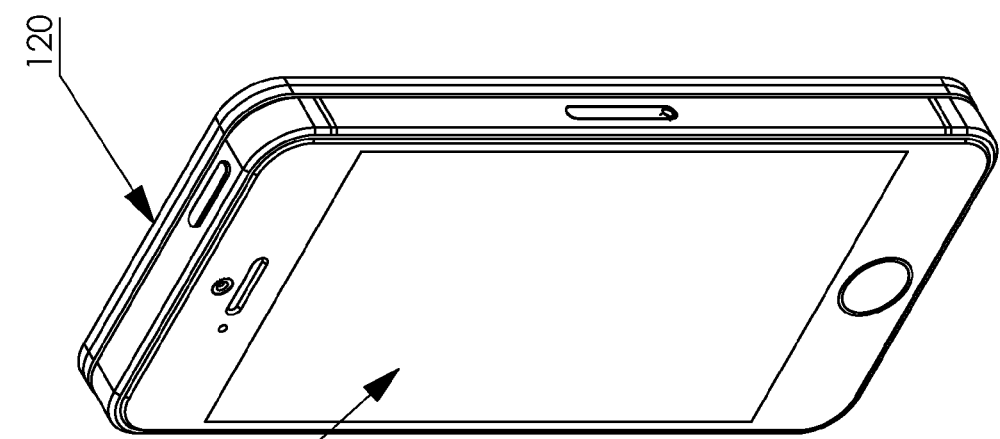
FIG. 1C illustrates a perspective view of the case having an antenna, installed on the electronic device.

The description of like structural elements among the figures is not repeated, the like elements have reference numerals differing by an integer multiple of 100, i.e., reference numeral 102 in FIG. 1, becomes reference numeral 202 in FIG. 2; unless differences and/or alternative aspects are explicitly noted.

DETAILED DESCRIPTION

In the following detailed description, various specific details are set forth in order to provide an understanding of and describe the apparatuses and techniques introduced here. However, the techniques may be practiced without the specific details set forth in these examples. Various alternatives, modifications, and/or equivalents will be apparent to those skilled in the art without varying from the spirit of the introduced apparatuses and techniques. For example, while the examples described herein refer to particular features, the scope of this solution also includes techniques and implementations having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

Electronic, communication, and computing devices have become increasingly popular. Many of these devices communicate with other devices or systems that transmit and/or receive wireless radio frequency (RF) communication signals. While wireless system infrastructure (e.g., cellular phone base stations), enabling communication with these mobile communication devices, has become more extensive, there are still many areas that do not receive strong or high quality wireless communications signals. Sometimes, a user may have difficulty using an electronic device due to the RF communication signals being weak, faint, distant, subject to interference, noisy, subject to reflections, subject to multipath effects, or a combination thereof.

Because wireless communication system providers typically provide services near population concentrations, the signals from these systems are often weak or faint in remote areas. Therefore, people engaging in outdoor activities are often in areas with weak wireless communication signals. These outdoor activities may include activities such as hiking, skiing, biking, camping, rafting, fishing, mountaineering, boating, snowshoeing, and rock climbing. Wireless communication may become very important when involved in one of these activities due to an injury, a medical need, being lost, experiencing difficult weather conditions, or to address another urgent matter. A person may engage in an activity in one of these areas not expecting to be in regular communication but may wish to have the option to communicate if a need or emergency arises. Similarly, people who work in, live in, and/or travel through remote or underserved areas may experience similar wireless communication challenges.

Wireless communication signals are often weak in these areas and may not be sufficiently strong to support communication with a standard mobile communication device. In some cases, wireless communication signals from a distant populated area may be present, but weak. This can be further complicated in areas having hills or mountains because wireless signals may be even weaker when a user is in a valley or in a shadow of a geographic feature. Many mobile communication devices are designed to be small, compact, and/or thin. Many are also designed with internal antennas. While these types of antennas may have a number of benefits, small, fixed, and/or internal antennas may not provide sufficient gain when a wireless communication device is being used in a disadvantaged location. A disadvantaged location may be a location where a user cannot place a call, cannot receive a call, cannot receive data, and/or cannot send data to another device. A disadvantaged location may also be a location where communication is possible, but is difficult due to poor signal quality.

When transmitting wireless communication signals from a mobile communication device, the strength of the signals transmitted by the device may be limited for a variety of reasons. These reasons include: transmitter capability limitations, communication standard requirements, antenna design, power limitations, user safety concerns, and/or government agency rules (e.g., Federal Communication Commission (FCC) rules).

In order to improve communications when communication signals are weak, supplemental antennas and antenna designs are provided herein. In some examples, the antenna is a position able antenna included in a case for an electronic device. In other examples, the antenna is a reflecting device used to concentrate wireless communication signals in order to improve communications with another device. The other device may be a cellular base station, a cellular tower, a small cell, an eNodeB, a wireless router, a WiFi access point, and/or a WiFi hotspot. In the case of two-way radio communications, the other device may be a two-way radio, a walkie talkie, or similar device. Supplemental antennas may be used to improve the uplink, the downlink, or both.

The deployable signal reflectors and antennas disclosed herein provide direct improvements over typical signal repeaters because they eliminate the need for a coupler and an amplifier. Reflecting surfaces direct energy directly to the internal antenna of the mobile device. A deployable signal reflector and antenna may function as an extension of the mobile device antenna. Because amplifiers require power, active repeater antennas are not conducive for usage in remote areas or emergency situations and are not as portable or lightweight as a passive reflecting antenna.

Figure 1B:
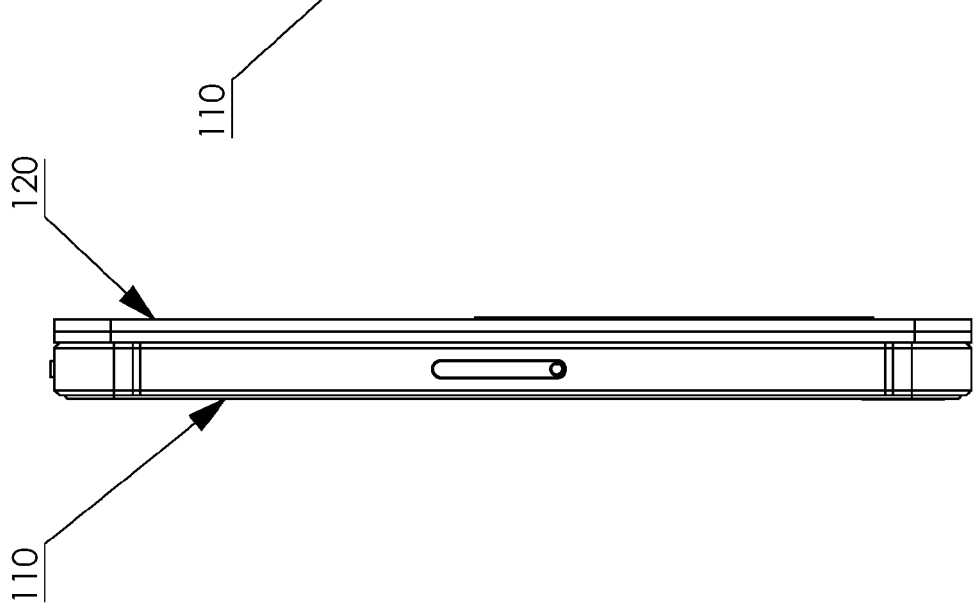
FIG. 1B illustrates a side view of the case having an antenna, installed on the electronic device.
Figure 1A:
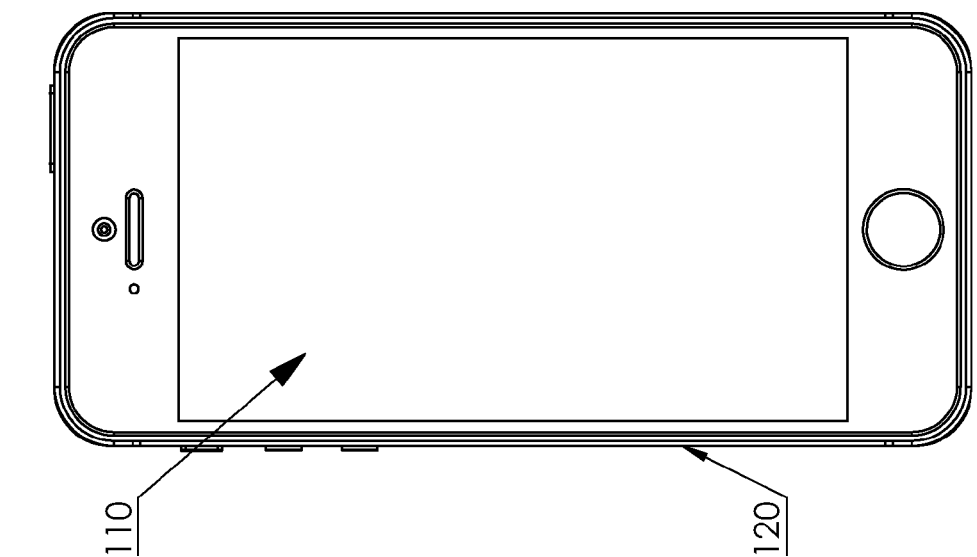
FIG. 1A illustrates a front view of a case having an antenna, installed on an electronic device.

FIG. 1A illustrates a front view of an example of a case 120 having an antenna, installed on an electronic device 110. Electronic device 110 may be a cellular phone, a smart phone, a two way radio, a tablet computer, a notebook computer, a camera, a global positioning system (GPS) receiver, a video player, an audio player, an electronic book reading device, or a combination thereof. Case 120 provides protection to electronic device 110. Protection may include protection from shock, impact, breakage, dropping, scratching, water, snow, dust, dirt, and/or other damaging forces or elements. Case 120 may protect various parts of electronic device 110 including protecting a display, a side, a back, a connector, and/or another component of electronic device 110, including combinations thereof.

Many different types of cases are possible and the techniques disclosed herein should not be limited to any particular type of case or to a case having any particular design or feature. In one example, case 120 protects only the front and one or more sides of electronic device 110. In another example, case 120 protects only the front of electronic device 110. In yet another example, case 120 protects only a display screen of electronic device 110. Case 120 may be made from a variety of materials including plastic, silicone, cloth, metal, ceramic, metalized ceramic, polymer, elastomer, or a combination thereof.

The wireless communication capabilities of electronic device 110 may include one or more of: cellular, Radio Frequency (RF), Wireless Fidelity (WiFi), Bluetooth, Near Field Communication (NFC), second generation (2G), third generation (3G), and/or fourth generation (4G) technologies including but not being limited to Global System for Mobile Communications GSM, Code Division Multiple Access (CDMA), Long Term Evolution (LTE), and/or other formats of wireless communication, and/or combinations thereof. Wireless communication signals are typically transmitted and/or received by electronic device 110 using one or more antennas. An antenna is any device that converts electrical power into radio waves and/or converts radio waves into electrical power. Electronic device 110 may have one or more externally visible antennas for performing communications. However, in many situations, one or more antennas are internal to electronic device 110.

The wireless communication signals transmitted and/or received by electronic device 110 may be weak or faint due to the distance from which they were sent, power limitations, antenna inefficiencies, or for other reasons. In addition, wireless communication signals may be subject to noise, interference, reflections, fading, effects of geographic features, or a combination thereof. Consequently, wireless communications can often be improved by using a supplemental antenna or signal reflector. As compared to an internal antenna of electronic device 110, a supplemental antenna may be larger, may be more efficient, may include amplification, may be better tuned to certain conditions, may be directional, may be adjustable, may have an antenna pattern better suited for the circumstances, and/or may be aim able or position able.

FIG. 1B illustrates a side view of the case 120 having an antenna installed on the electronic device 110. FIG. 1C illustrates a perspective view of the case 120 having an antenna installed on the electronic device 110.

FIG. 2A, illustrates a perspective view of a case 220 including an antenna 230 in a stowed position. As further illustrated in FIG. 2B, antenna 230 pivots out from case 220 and can be placed in a plurality of positions relative to case 220 and electronic device 210 inside case 220. In some situations, wireless signal strength and/or quality for electronic device 210 may be improved by changing a position and/or angle of an antenna relative to the other device(s), the electronic device 210 is attempting to communicate with. Using the fixed position antennas (also called native antennas) in many electronic devices, this would require changing the position and/or angle of electronic device 210. This may be inconvenient for the user and/or the user may not be aware of a better direction. In some situations, the user may be using electronic device 210 for a voice call. In other situations, the user may be using a keyboard or touch screen of electronic device 210 while it is laying on a table or other surface. In these and other situations, it may be difficult, inconvenient, or impossible to change the position of electronic device 210 to attempt to improve the signal quality and/or signal strength.

Although antenna 230 is described primarily with respect to its RF functions, antenna 230 may also have other features. For example, antenna 230 may be designed in a shape that makes it easy to grasp or move. Antenna 230 may be encased in plastic or another material and have a shape that makes it easier to handle, easier to move, easier to see, safer, and/or more aesthetically pleasing.

In some configurations, opening, extending, activating, and/or un-stowing antenna 230 may also provide access to some or all of electronic device 210. For example, un-stowing antenna 230 may place antenna 230 in a better physical position to improve communications as well provide access to one or more controls of electronic device 210.

Beneficially, antenna 230 may be moved to various positions without having to move or change a position of electronic device 210 or case 220. Antenna 230 can be rotated or pivoted to another position which provides improved signal strength to and/or from electronic device 210. Although antenna 230 is illustrated as pivoting from case 220 in one direction, antenna 230 may be movable in another direction, and/or may be position able in two or more axes with respect to case 220. Antenna 230 may provide increased signal quality and/or strength to and/or from electronic device 210 because it can be positioned in a more optimum direction which is more suitable for a given situation. In some situations, antenna 230 may be positioned such that it is in a vertical, or partially vertical, position even though electronic device 210 is sitting horizontally, or partially horizontally. This may occur when a user has the electronic device lying on a desk and is using the touch screen without holding the device or when the device is sitting on a table and being used as a hotspot.

In addition to providing signal improvements over the native antenna because it is position able, antenna 230 may also have other features that provide an advantage over the internal antenna. These features may include: larger size, better efficiency, tuning for a particular frequency or frequency range, optimized for a particular power range, an antenna pattern that is different than an antenna pattern of the internal antenna, directionality, higher quality materials, amplification (where permitted by local regulations), and/or antenna 230 may be shielded by fewer materials than the internal antenna (i.e., it is not inside electronic device 210 or case 220).

Antenna 230 may cover a combination of voice/cellular/data frequency bands, voice bands only, data bands only, and/or could also be configured to cover WiFi, Bluetooth, GPS, NFC, and/or another method of wireless communication. Antenna 230 may also be connected to another radio transceiver inside case 220 which receives television signals, radio signals, two-way radio signals, or a combination thereof.

Antenna 230 may extend from or attach to case 220 in a different manner than is illustrated in FIGS. 2A and 2B. For example, antenna 230 may slide out from case 220 rather than rotating or pivoting from case 220.

Because case 220 may be designed and/or manufactured independently of electronic device 210, case 220 may not have a direct electrical connection through which to interface antenna 230 to the native antenna of electronic device 210. In addition, the native antenna of electronic device 210 may be internal such that it is not externally physically accessible. Therefore, case 220 may wirelessly or electromagnetically couple antenna 230 to the native antenna of electronic device 210. In some situations, this type of coupling may be referred to as parasitic coupling. From the standpoint of the end user, antenna 230 may be coupled to the native antenna simply by installing case 220 on electronic device 210. In other situations, a connector associated with case 220 or antenna 230 may plug into an RF connector of electronic device 210 to make the antenna connection.

In some situations, antenna 230 may be coupled to the native antenna using an aperture coupled micro strip or patch antenna. This type of antenna is also sometimes referred to as an aperture coupled antenna, or an aperture coupled patch antenna. These types of antennas are known and used in the antenna arts. An aperture coupled design eliminates the need for a direct electrical connection by using two dielectric substrates separated by a ground plane. Antenna 230 may be electromagnetically coupled to the native antenna of electronic device 210 through one or more isolated micro strip transmission lines in case 220 and through a small slot or aperture in an isolating ground plane. Alternately, another type of signal RF signal line, such as a coaxial cable, a strip-line, a twin-lead, or a coplanar waveguide may be used in place of the micro strip transmission line.

The characteristics of aperture coupled antennas may be affected by, among other things, changing dimensions of the slot or aperture in the ground plane. Therefore, the aperture coupling to antenna 230 may effectively be enabled or disabled by changing one or more dimensions of the aperture. In one implementation, one or more dimensions of the aperture are changed when antenna 230 is rotated into an active or un-stowed position. In other words, when antenna 230 is in an un-stowed or operational position, the aperture is sized such that the native antenna of electronic device is effectively and/or efficiently coupled through case 220 to antenna 230. In this mode, electronic device 210 benefits from the improved signal strength or quality provided by antenna 230. Antenna 230 may be moved to a variety of different positions or angles in order to improve the signal strength or quality.

In contrast, when antenna 230 is moved to the stowed or in-operational position, one or more dimensions of the aperture or slot are changed such that the coupling is no longer efficient, no longer effective, no longer occurs, or is significantly reduced. This effectively decouples antenna 230 from the native antenna of electronic device 230. In this configuration, the electronic device operates in its 'factory' mode using the internal or native antenna even though the device is installed in or attached to case 220. The connection to antenna 230 may automatically occur when antenna 230 is opened, un-stowed, extended, or flipped open. Disconnection may automatically occur when antenna 230 is closed, stowed, or returned to a home position. The coupling may also be enabled or disabled by changing one or more other dimensions or parameters, such as by changing a size of the patch that makes up the patch antenna.

In some situations, the changing of the aperture size discussed above may occur through a shutter or shutter-type mechanism that changes the size of the aperture in response to physical movement of antenna 230. In other situations, the changing of the aperture size may occur in response to a separate action of the user. This separate action may be activation of an electrical switch, manipulation of a mechanical element, selection of an option in a software application or program, or a combination thereof.

In some configurations, case 220 may contain an electromechanical interface for making a hard or wired connection between electronic device 210 and an alternative external antenna (not pictured). The electromechanical interface to the alternative external antenna may be in addition to or in place of antenna 230. The interface may enable a user to attach a larger or different type of antenna that provides improved signal strength and/or signal quality improvements under certain situations. The electromechanical interface may enable a user to temporarily utilize a directional or beam antenna when in remote locations where the native antenna of the communication device, and possibly even antenna 230, may not be sufficient.

For example a hiker going on an expedition may separately carry a Yagi antenna for emergency situations. A Yagi antenna is a directional antenna consisting of a driven element, such as a dipole or folded dipole, and additional parasitic elements. Yagi antennas typically provide significant increases in directionality and gain over dipole antennas. Other types of alternative external antennas are possible. The electrical interface for connecting to this type of antenna may also be configured to disconnect antenna 230 when the connection is made. In other words, case 220 may provide a connection to antenna 230 when antenna 230 is activated, extended, flipped out, or un-stowed, but may also automatically disconnect antenna 230 when a Yagi or other alternative external antenna is attached.

Alternately, switching between the various antennas may be manually controlled by a user and/or may be controlled using a software application. In some situations, the electromechanical interface is an RF port that may either be on electronic device 210 or on case 220. In some situations, an external antenna attached to electronic device 210 or to case 220 may be configured as an array of two or more antennas. The array may or may not include the native antenna of electronic device 210 and/or antenna 230.

FIG. 3A illustrates a front view of an electronic device 310, e.g., a smart phone. The areas along the top 310A edge and the bottom edge 310B of the smart phone 310 designate areas where internal antenna(s) are typically mounted.

FIG. 3B illustrates a side view of case 320 installed on the smart phone 310. Case 320 includes an external antenna 330. As illustrated, smart phone 310 includes an internal antenna 312B along its bottom edge. Case 320 couples signals between the internal antenna 312B and the external antenna 330 via a signal coupling mechanism 350 and a signal routing means 355. Signal routing means 355 may comprise transmission lines such as a coaxial cable, a micro-strip, or any other signal routing means known to a person of ordinary skill in the art. It will be appreciated that the external antenna 330 may comprise any of the antennas disclosed in FIG. 5-FIG. 14, infra.

FIG. 3C illustrates a rear view of the case 320 installed on the smart phone 310.

FIG. 3D illustrates a perspective view of the case having an external antenna.

Figure 4:
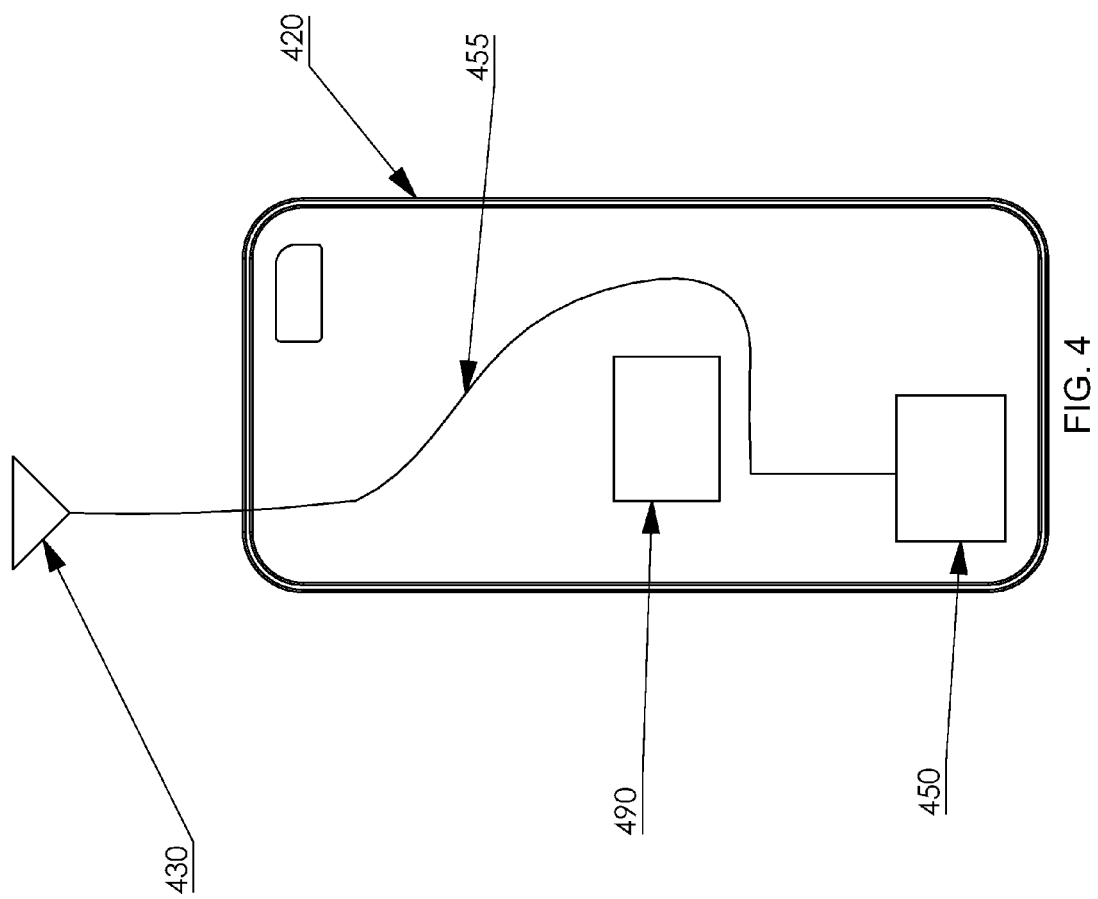
FIG. 4 illustrates alternate variation of a case having an external antenna.

FIG. 4 illustrates an alternate variation of the case 420. As illustrated in FIG. 4, the signal routing means 455, does not have to follow the shortest path between the signal coupling mechanism 450 and the external antenna 430, but may be shaped to avoid proximity of an electronic component 490, of the smart phone 410, e.g., an antenna, proximity sensor, a speaker, or any other component known to a person of ordinary skill in the art.

An antenna used in accordance with the techniques introduced here may be substantially larger and/or more conveniently placed than an internal antenna of a phone or a mobile computing device. When the external antenna is in the stowed position, the parasitic coupling mechanism may be disengaged, similar to a shutter being opened, thereby allowing the native antenna to revert to its 'factory' condition or mode of operation. When the external antenna is deployed, the parasitic coupling mechanism engages, similar to a shutter closing over the native antenna. An LED or other visual cue may also be included on the case when the external antenna is deployed and/or when a certain signal quality or signal strength threshold condition is satisfied. For example, the visual cue may be activated when the signal strength or quality exceeds a specified value, which may not otherwise be met when the external antenna is stowed, or if a specified minimum data transfer rate is exceeded.

As described above, the case may also include an antenna port for hooking up an alternate, higher gain, directional, antenna to the transmission line/coupling mechanism which bypasses the external antenna. This may be useful in areas that are particularly poorly served by a cellular base station or other wireless communication system such as wilderness areas for camping or hunting. The directional antenna is attached to the secondary RF port and signals are routed to and from the folding antenna instead to the directional antenna. The directional antenna may be lightweight and able to be folded and stowed compactly. The protective case may include one or more slots or recesses for stowing of the directional antenna. When unfolded and deployed, the directional antenna is attached via an RF cable to the port so the phone can be used in remote areas or other areas with challenging signal conditions.

A software application ("app") may also be used in conjunction with the case and/or antennas described above. The software application may be used to help determine one or more locations of cellular towers, base stations, or other signal sources. This information may be used to assist the user in pointing or aiming a directional antenna. The software application may gather information about the user's position or location from a GPS receiver in the electronic device, from an external GPS receiver, from a base station, and/or from a compass. This information may be cross-referenced to a database of positions of towers or base stations that may be accessible by the device. The database may be stored in the electronic device, in the software application, or may be accessed externally. The software application may also indicate a line of bearing from the user's position to the tower or base station for assistance in positioning or aiming the directional antenna.

During the course of normal electronic device usage, the software application may also notify the user when he or she is approaching an area of known poor signal strength or quality. This notification may also include a suggestion or notification to deploy the otherwise stowed antenna in order to improve signal quality. In some configurations, the software application may run in the background and track the user's location to alert the user when approaching an area where signal strength is known to be poor, where calls are frequently dropped, and/or where other signal quality issues exist. A signal quality database may contain data gathered from that device, from that user, from a service provider, and/or from a crowd sourced data source that gathers information from many users. The user may be able to configure various aspects, features, or parameters of the software application to operate in a preferred or customized manner.

The software application may be stored in the electronic device or may be stored in the protective case and downloaded to the electronic device from the protective case. In addition, the software application may be downloaded from a remote server, such as from a software application store or website.

In addition to improving signal quality, approaches described herein may raise or lower the radiation point of the antenna, sometimes referred to as the 'phase center,' to a point above or below the electronic device's upper surface such that the radiation pattern of the external antenna is predominantly omni-directional in the azimuth plane, or the plane which is perpendicular to the plane of the screen of the electronic device. Consequently, electromagnetic radiation may be routed away from a user's head or hand in a direction that results in a reduction in the amount of energy directed at the user's head and/or hand.

The techniques described herein may also increase the effective size and/or efficiency of the native antenna by redirecting electromagnetic energy to a larger external antenna. Increasing the effective size and/or efficiency of the native antenna typically improves the device's sensitivity to weak signals and improves the device's ability to connect to a base station at farther distances and/or to a base station that is inconveniently located with respect to the user's location. It may also improve the device's ability to communicate with a base station when other signal quality issues are present such as fading, interference, and/or reflections. In many situations this will result in fewer dropped calls and/or improved data transfer rates.

The parasitic coupling mechanism described herein allows a user to install a protective case as if it were a typical external protective case having no electrical interfaces to the communication device. The parasitic coupling mechanism reroutes or transfers electromagnetic energy which would have otherwise been radiated into free space to the case antenna via a transmission line. Beneficially, energy is coupled from the native antenna to this potentially more effective antenna via a simple installation procedure that does not require the user to make RF or electrical connections.

The direct coupling mechanism described herein may also be used for electronic devices where an RF port is available which bypasses the native antenna and routes electromagnetic energy directly into and/or out of the RF front-end of the electronic device. This approach uses an RF connector to route energy from the mobile communication device to the external antenna via the transmission line, versus the parasitic coupling mechanism. In some configurations, this may result in a more direct and/or efficient coupling of the RF signal from the external antenna into the electronic device's RF front-end circuitry where the signal is processed.

While the examples above describe a supplemental antenna included in a case for a communication device, antennas external to the case may also be used. One class of antennas comprise reflective antennas. A reflective antenna comprises an antenna reflector and an antenna feed fixedly located at the focal point of the reflector by a support structure. The design of the support structure and the antenna feed is carefully designed for minimal shadowing of the reflector, and illumination of the reflector. Antenna feed refers to the component(s) of an antenna which, in transmit mode, receives signals, e.g., in a form of electric current, from a remote transceiver via a transmission line, converts the signal into radio waves, and feeds the radio waves energy towards the reflector. The reflector produces a collimated plane wave in the far field. The parabolic reflector also collects plane wave energy from the far field transmitted by the opposite terminal and focuses it to the fixed antenna feed at the focal point in receive mode. The antenna feed then converts the energy to signal, e.g., electric currents, and provides the electric currents to the transceiver. The parabolic antenna, with its associated feed, has substantially higher gain than the antenna feed in isolation.

Figure 5D:
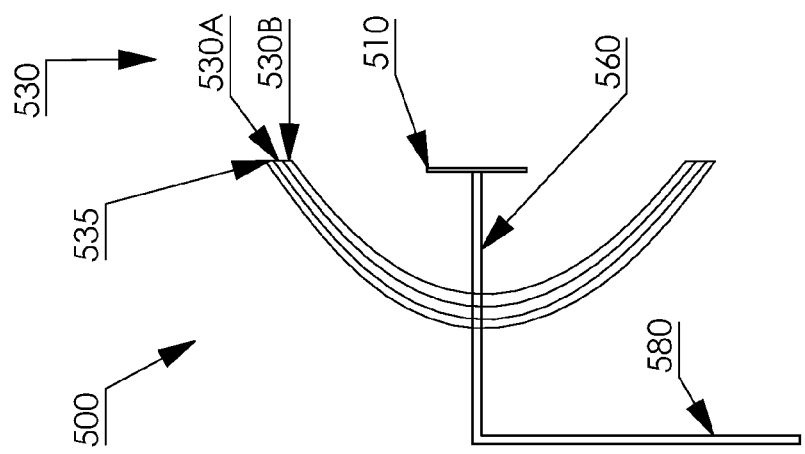
FIG. 5D illustrates a configuration of the portable antenna for use with a communication device including a solar panel.
Figure 5B:
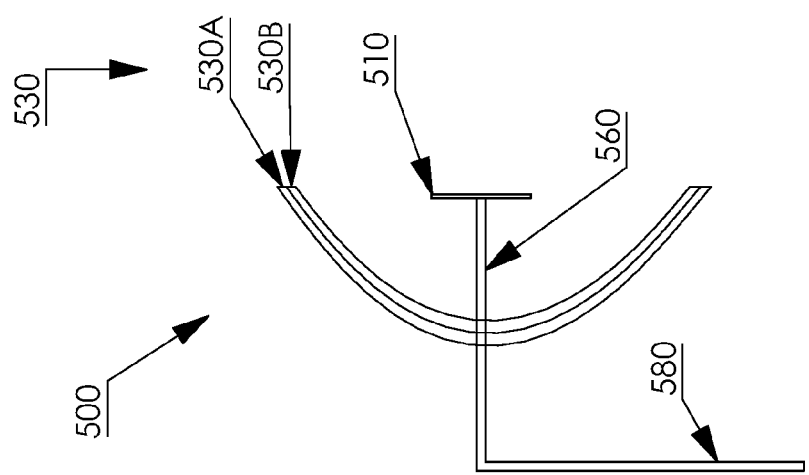
FIG. 5B illustrates a side view of an alternative configuration of the portable antenna for use with a communication device.
Figure 5A:
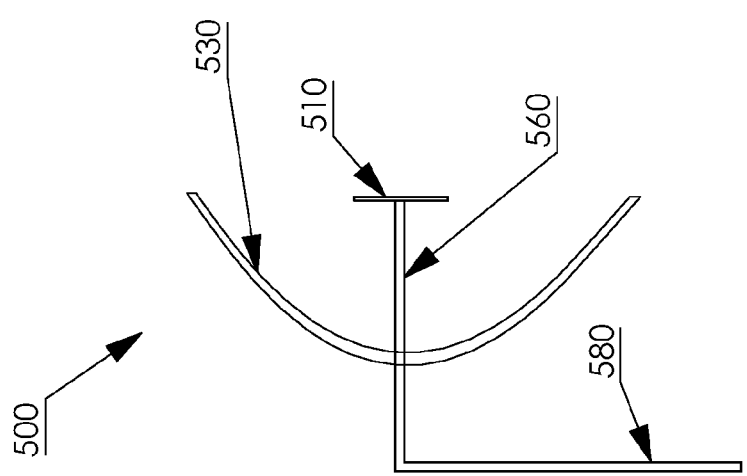
FIG. 5A illustrates a side view of a portable antenna for use with a communication device.

FIG. 5A illustrates a side view of a portable stow-able antenna that is not part of a case for the device and is designed to collect and/or concentrate RF energy. The RF energy may be RF energy transmitted from the communication device or RF energy received by the communication device. In FIG. 5A, communication device 510 comprises any type of device with wireless communication capabilities. Communication device 510 may be a cellular phone, a smart phone, a two way radio, a tablet computer, a notebook computer, a camera, a GPS receiver, a video player, an audio player, a mobile hotspot, an electronic book reading device, or a combination thereof.

As well known in the art, some cellular phones, especially smart phones, have a built-in hotspot functionality. Thus, these phones are capable of connecting to a core network and then act as a router, distributing the data received from the core network to nearby devices. The term core network is understood as a high capacity communication facility that connects primary nodes of a communications network. Thus, taking the cellular network as an example of a communications network, base station(s), i.e., the primary nodes, facilitate connection with cellular phones, and/or smart phones, i.e., the secondary node(s). The cellular phones, and/or smart phones and the nearby devices comprise a secondary network. In general the technology of delivering the data over the core network is different from the technology of delivering the data over the secondary network. By means of an example the core network may comprise any of the 2G, 3G, and/or 4G technologies including but not being limited to Global System for Mobile Communications (GSM), different flavors of Code Division Multiple Access (CDMA), i.e., CDMA200, Wideband-CDMA (W-CDMA), Universal Mobile Telecommunications System (UMTS), Enhanced Voice-Data Optimize (EVDO), or Long Term Evolution (LTE), and/or other types of Wide Area Network (WAN) technologies known to a person of ordinary skill in the art. By means of an example, the technology of delivering the data over the secondary network may be based on the Institute of Electrical and Electronics Engineers' (IEEE) 802.11 standards, Bluetooth, Ultra-wideband (UWB), and/or other types of Local Area Network (LAN). technologies known to a person of ordinary skill in the art.

A person of ordinary skill in the art will understand that the cellular phones, and/or smart phones with hotspot functionality may be replaced by a dedicated hotspot device.

The portable antenna 500 of FIG. 5A includes reflector 530. Reflector 530 comprises any material or device for reflecting electromagnetic energy from a source toward communication device 510, which is placed at a preferred position near or at a focal point of reflector 530, and/or for reflecting electromagnetic energy from communication device 510 placed at the preferred position near or at the focal point of reflector 530 toward a receiver by means of reflection from reflector 530. The reason why the preferred position is not necessarily at the focal point is that depending on the shape of the reflector 530, the focal point comprises an area. As disclosed supra, the communication device 510 may have one or more native internal antennas at different areas; therefore, the preferred position is given by the relationship between the focal point and the one or more native internal antennas. In one example, the other source and/or receiver are a cellular network base station.

As disclosed, reflector 530 may comprise any material for reflecting electromagnetic energy. Properties of the material affecting reflectivity comprise, e.g., conductivity, resistivity, surface roughness or smoothness, and other properties known to a person of ordinary skill in the art, may be selected based on a frequency range of interest. In addition, the choice of the material is affected by structural properties enabling an ability to hold shape, but be flexible for stowability. By means of an example, such materials may comprise a conductive fabric, conductive mesh or screen, and other materials known to a person of ordinary skill in the art.

FIG. 5B illustrates a side view of an alternative configuration of the portable antenna for use with a communication device, wherein, the reflector 530 may comprise a first material 530A, selected based primarily on the structural properties, and the material 530B, selected based primarily for reflecting electromagnetic energy, may be applied on a surface of the first material 530A.

Reflector 530 has a shape that concentrates or focuses received electromagnetic energy on a focal point. Communication device 510 is held in a preferred physical position near or at the focal point of the reflector 530 by a support 560. The focal point is a function of the shape of the reflector 530. Support 560 may include a cradle for holding communication device 510, or support 560 may hold communication device 510 using another device or method. In this way, an RF communication signal which may have been too weak for communication device 510 to utilize without the aid of reflector 530 may be concentrated such that the reflected RF communication signal is sufficiently concentrated to make the signal usable by communication device 510 (e.g., the received signal strength indicator (RSSI) exceeds a minimum threshold). The boom 560 and the cradle may be adjustable to position the communication device 510 to the preferred position maximizing reflected RF communication signal received by the one or more native internal antennas. The preferred position may be determined by maximizing the RSSI, either by subjective estimate based on, e.g., voice quality, data speed, or by reported RSSI or other signal-strength indicator by the mobile device 510 (e.g., number of bars or a numerical RSSI value for certain types of mobile devices) or by a software application disclosed elsewhere, after the aim of the reflector 530 toward a communication tower or other communication source has been established. Support 560 comprises any arm, bracket, boom, mast, or other mechanical device or structure to position communication device 510 at or near the preferred position with respect to reflector 530. Thus, although a support comprising a single arm extending from an apex of the reflector 530 to the preferred position is depicted in FIG. 5-FIG. 14, such is for clarity of explaining the concept. Consequently, other mounting arrangements, e.g., one or more structures extending from different positions on the reflector are contemplated. In addition to concentrating electromagnetic energy received from another location at communication device 510, reflector 530 also reflects electromagnetic energy transmitted by communication device 510 toward the other location.

In one example, reflector 530 may be formed in the shape of a parabola or a paraboloid. Reflector 530 may be parabolic in only one axis or may be a circular paraboloid. A parabolic shaped reflector transforms an incoming plane wave traveling along an axis of the reflector into a spherical wave converging toward the focal point of the parabola, which thus comprises the preferred physical position for the communication device 510. Similarly, a spherical wave generated by a point source located at or near the focal point, such as communication device 510, is reflected into a plane wave propagating as a collimated beam or plane wave along the axis. In this way, a larger percentage of communication device's radiated energy is transmitted in a preferred direction making it more likely that a distant base station or receiver is capable of receiving transmitted information. This configuration provides increased antenna gain for communication device 510, relative to use without a reflector, in both the transmit and receive directions.

In the exemplary configurations illustrated in FIG. 5A and FIG. 5B, the feed for reflector 530 is communication device 510 itself. One or more native internal antennas of the communication device 510 feed reflector 530 to provide substantially higher transmit and receive gain, which improves sensitivity to weak signals. When the placement of the communication device 510 is adjusted to be near or at the focal point of reflector 530, as disclosed supra, energy radiating from the communication device 510 reflects off reflector 530 towards an opposite node, e.g., base station. Energy from the opposite node is collected by the reflector 530 and focused toward the communication device 510.

FIG. 5A and FIG. 5B also illustrate stand 580 for supporting reflector 530, boom 560, and communication device 510. Stand 580 enables reflector 530 to be held in a preferred position. While stand 580 is illustrated as a single post, stand 580 may comprise additional mechanical components for supporting the assembly on the earth, attaching the assembly to the earth, and/or for attaching the assembly to another object such as a tree, rock, or vehicle. Stand 580 may also include additional mechanical components that allow reflector 530 to be adjusted to different positions after stand 580 has been placed or attached in a fixed position. In some cases, stand 580 may comprise a tripod. The components illustrated in FIG. 5A, FIG. 5B, and FIG. 5C may be capable of disassembly to be carried in a backpack, in a vehicle, on a bike, or in another location such that they are available during a trip or expedition to a remote location or to a location with otherwise disadvantaged wireless communication service. Reflector 530 may also be useful to emergency responders who must operate in remote locations or in locations where a communication system is not operating properly.

Because communication device 510 needs to stay near or at the focal point in order to continue to receive the benefit of reflector 530, for voice communications, a wired or wireless headphone may need to be connected to communication device 510 with the user standing out of the way of the field of view of reflector 530. Alternately, communication device 510 may be used in a speakerphone mode. This is, of course no issue if the communication device 510 comprises a dedicated hotspot, or comprises a cellular or smart phone used in hotspot functionality.

Figure 5C:
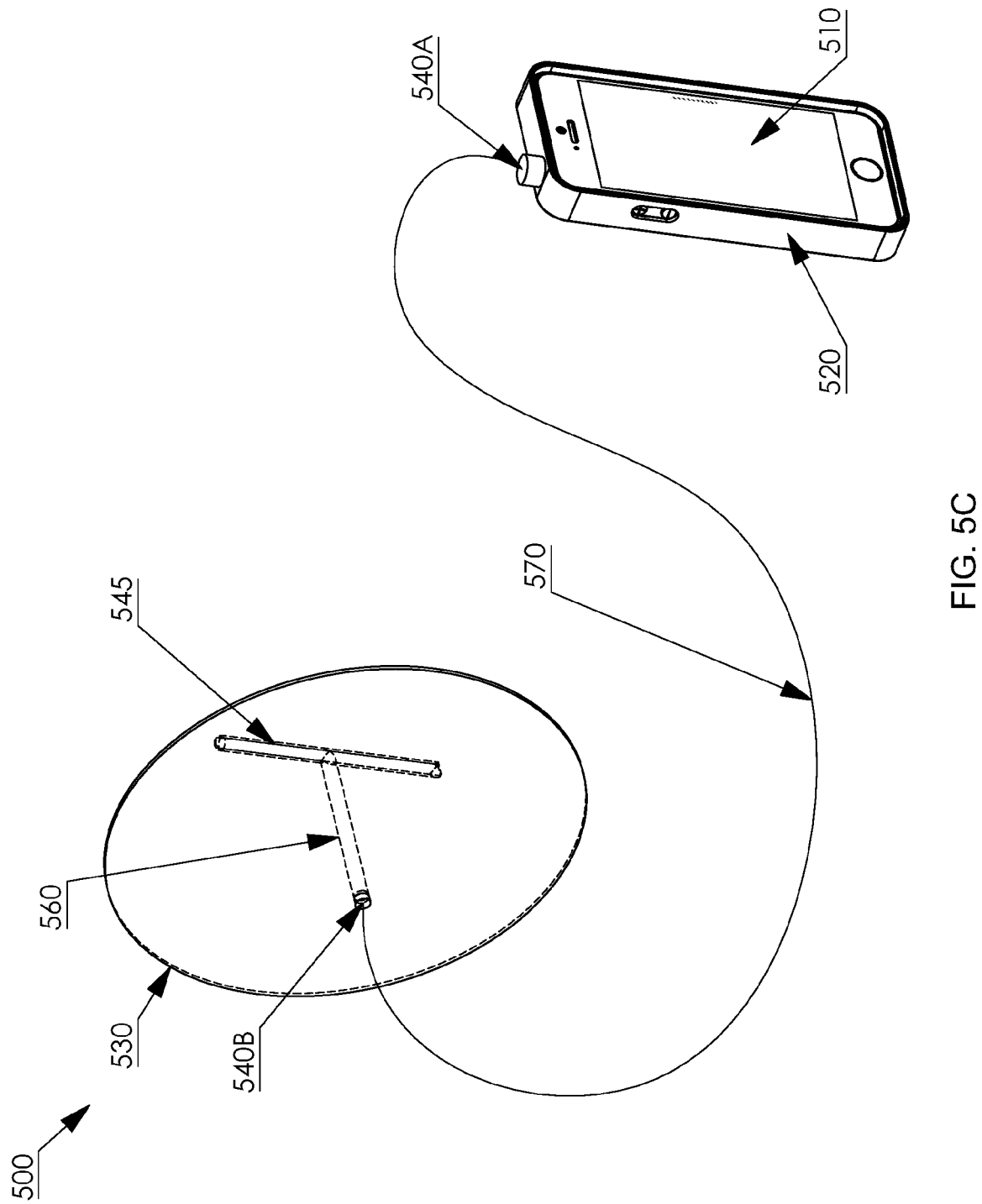
FIG. 5C illustrates perspective view of an alternative configuration the portable antenna for use with a communication device.

In an alternative configuration, the mobile device 510 can be configured to direct RF signals to and from its native antennas as illustrated in a perspective view of FIG. 5C. The mobile device 510 is inserted into case 520, which couples signals from the internal antenna (not shown) of the mobile device 510 via a signal coupling mechanism (not shown). A signal routing means (not shown) routes the coupled signal into a connector 540A. A person of ordinary skill in the art will appreciate that the case 520 and the associated components may comprise case disclosed supra. In one aspect, the reflector 530 may comprise a connector 540B, which enables coupling of the feed 545 of the reflector 530 with the mobile device via an external routing means 570. In another aspect, the external routing means 570 is integral part of the reflector 530, thus eliminating the connector 540B. The external routing means 570 may comprise a coaxial cable, a micro-strip, a strip-line, a twin-lead, a coplanar waveguide, or any other signal routing means known to a person of ordinary skill in the art. This configuration allows the user to interact with mobile device 510 while it is being used in conjunction with reflector 530 during a voice call or while transferring data to and from a distant cellular tower or base station.

While an axial, front feed configuration is illustrated in FIG. 5A, FIG. 5B, and FIG. 5C, other parabolic configurations are possible. For example, communication device 510 and reflector 530 may comprise other parabolic antenna configurations such as: off-axis, offset feed, Cassegrain, and/or a Gregorian configurations known to a person of ordinary skill in the art. Furthermore, reflector 530 may have a shape that is not parabolic but still provides some level of focus or concentration of the received electromagnetic energy on communication device 510. For example, reflector 530 may have a hyperbolic shape, an elliptical shape, a spherical shape, or another shape which causes partial or complete beam collimation.

As disclosed supra, the portable antennas are indented primarily, but not exclusively, for use in remote or undeserved areas, or activities taking place in areas with weak wireless communication signals. It is likely, that access to electrical power in such areas may be limited or nonexistent.

Consequently, as illustrated in FIG. 5D, a solar panel 535 may be applied on the surface of the reflector comprising a first material 530A with the electromagnetically reflective material 530B applied on a surface of the first material 530A. The energy generated by the solar panel 535 may be used to power or charge the communication device 510. A person of ordinary skill in the art will appreciate that in the aspect of the reflector comprising only the electromagnetically reflective material 530B, the solar panel 535 may be applied on the surface of the electromagnetically reflective material 530B.

Although the inclusion of a solar panel is depicted in FIG. 5D only, a person of ordinary skill in the art will understand that the concept of applying a solar panel is applicable to any of the portable antennas disclosed in FIG. 6-FIG. 14, infra.

FIG. 6A illustrates a front view of a collapsible antenna 600. Collapsible antenna 600 comprises conductive material 630 and wires 624. Conductive material 630 may be any type of flexible, foldable, and/or roll able material, such as a conductive fabric, a metallized fabric, a conductive plastic, a metallized film, a conductive screen, a conductive mesh, a conductive material laminated to a nonconductive material, a coarse conductive mesh comprising discrete wires or tubes, or a combination thereof. Conductive material 630 has characteristics that make the material reflective, at least partially, with respect to electromagnetic waves in at least a preferred frequency range. Wires 624 are either rigid, or semi-rigid, comprise a mechanical support structure, holding conductive material 630 in a preferred shape or in tension such that it forms a reflector shaped as described with respect to FIG. 5. Wires 624 may be inserted into pockets, sleeves, loops, eyelets, or other features of conductive material 630 in order to hold conductive material 630 in position in a preferred shape.

Although they are described as "wires," the structures 624 are not necessarily constructed of a metallic material and may be constructed of plastic, wood, carbon fiber, a composite, or another material, including combinations thereof. While five wires 624 are illustrated in FIG. 6A, a different number of wires is possible, including more wires or fewer wires. Another type of rigid, or semi-rigid, support or mechanical structure may be used in place of one or more of wires 624. Each of wires 624 may be a single piece or may be comprised of multiple pieces in order to allow the components of collapsible antenna 600 to be stored in a small container when disassembled. Although wires 624 are illustrated in a spiral configuration, other configurations are possible that provide the necessary support to form or hold conductive material 630 in a preferred shape and to be lightweight and/or portable and, when collapsed, may be stowed into a package for transport in a backpack, suitcase, tool box, or similar container.

FIG. 6B illustrates a side view of collapsible antenna 600 of FIG. 6A. Conductive material 630 is held in position by wires 624 as in FIG. 6A although wires 624 are not visible in FIG. 6B. Communication device 610 is held in a preferred position near or at a focal point of collapsible antenna 600. This focal point or region is chosen to maximize antenna aperture efficiency, antenna gain, and/or the input impedance of the antenna of the mobile device. The region may be tuned or chosen to optimize one or all of those parameters. Mobile device 610 is held in position by arm 660 which is a mechanical boom, support, or bracket that attaches to collapsible antenna 630 and/or wires 624 to establish and maintain the physical orientation between collapsible antenna 630 and communication device 610.

FIG. 6C illustrates a transportable container 698 containing disassembled collapsible antenna 600 of FIGS. 6A and 6B. Collapsible antenna 600 is placed into transportable container 690 in order to make collapsible antenna 600 more convenient to store or transport and to provide protection to the components of collapsible antenna 600. Transportable container 690 is illustrated as having a cylindrical shape although other shapes and configurations are possible. In some situations, transportable container 690 may be a waterproof and/or floating container in order to provide further protection for collapsible antenna 600.

Figure 7B:
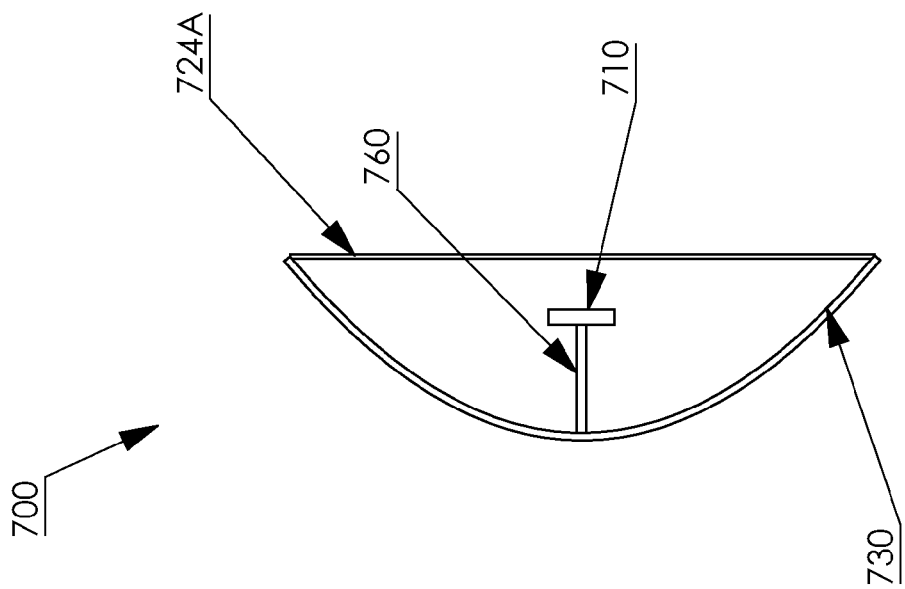
FIG. 7B illustrates a side view of the portable antenna.
Figure 7A:
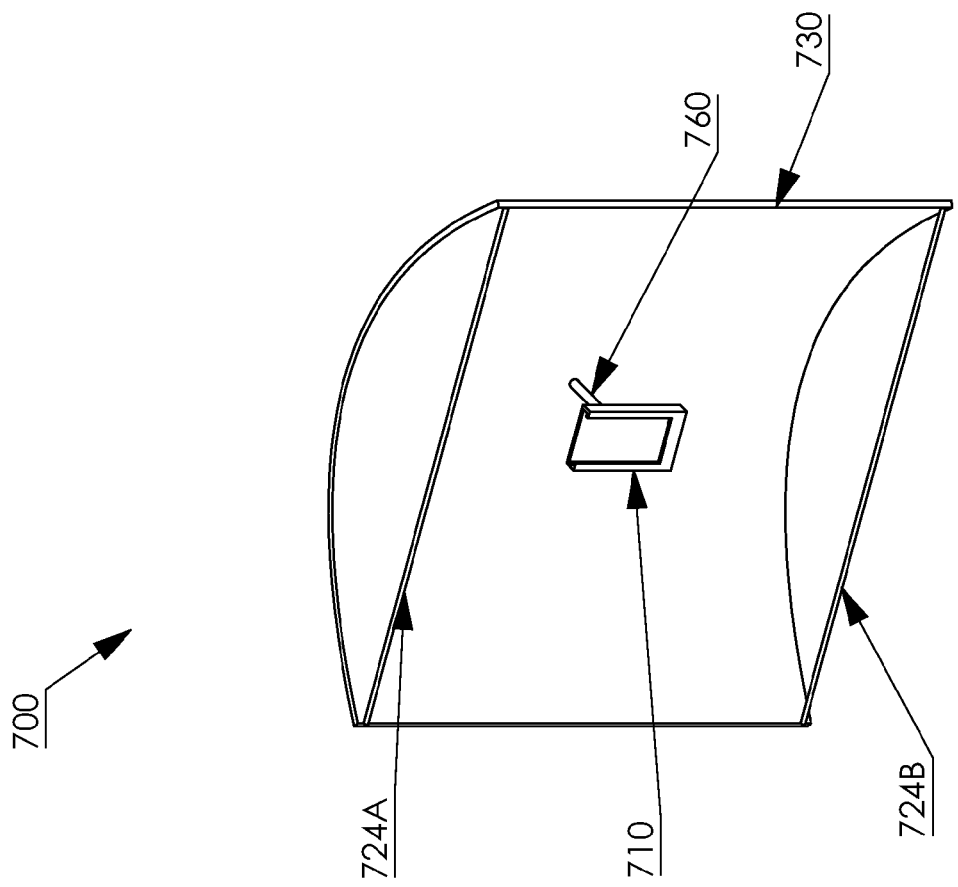
FIG. 7A illustrates a perspective view of a portable antenna.

FIG. 7A illustrates a perspective view of a portable antenna 700. Portable antenna 700 comprises reflector 730, supports 724A, 724B, and boom 760 for supporting communication device 710. Reflector 730 comprises an electromagnetically reflective material for reflecting wireless communication signals transmitted from another location toward communication device 710 and for reflecting electromagnetic signals transmitted from communication device 710 toward the other location. Reflector 730 may comprise a fabric, a film, a plastic, a screen, and/or a thin metallic sheet. Reflector 730 may be held in position by one or more supports, such as supports 724. Reflector 730 may be configured such that it inherently relaxes or returns to a rolled up or coiled position when not held open by supports 724. Reflector 730 as shown in the figure has a curved or parabolic shape in one axis but not in the other. While this configuration may not result in as much electromagnetic energy being reflected toward communication device 710 as would be reflected by a reflector of a circular paraboloid shape (i.e., described by a parabolic line which is rotated about a central axis to produce parabolic surface), but the gain increase may be sufficient to permit communication from a disadvantaged location between communication device 710 and another device where it may not have been otherwise possible while simplifying the mechanical deployment and stowage of antenna 700. FIG. 7B illustrates a side view of portable antenna 700.

Figure 8B:
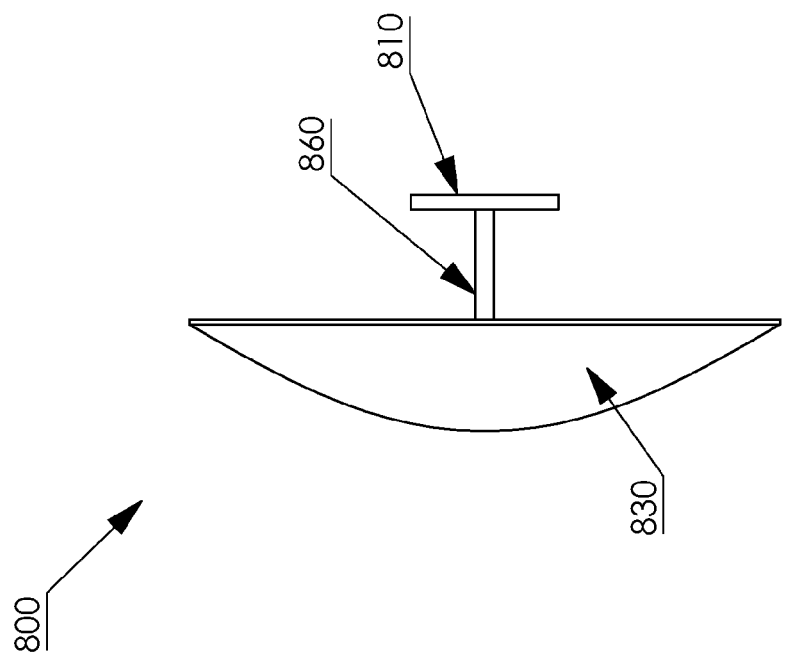
FIG. 8B illustrates a side view of the stow-able antenna.
Figure 8A:
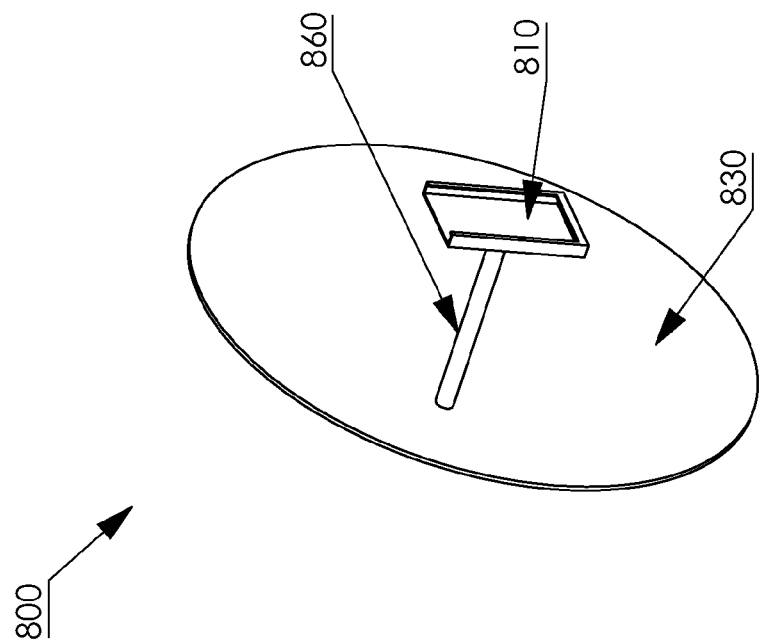
FIG. 8A illustrates a perspective view of a stow-able antenna.

Whereas the geometry of portable antenna 700 of FIGS. 7A and 7B can be described as a symmetric parabolic curve with even symmetry about a horizontal axis that is swept linearly along a vertical axis, to create a three-dimensional parabolic reflector which is singly-curved in only one plane, FIGS. 8A and 8B illustrate a perspective view, respective a side view of a stow-able antenna 800 that is curved or parabolic in more than one axis. This geometry is defined by a symmetric parabolic curve with even symmetry about an axis which is rotated about the axes to produce a parabolic dish. Stow-able antenna 800 includes a reflector 830 and boom 860 supporting communication device 810. Reflector 830 comprises a parabolic dish shape and is supported by one or more structural elements (not shown) to have this type of shape. The structural elements may comprise structural elements disclosed supra, e.g., in FIG. 6 and associated text.

FIG. 9A illustrates a front view of a deployable antenna 900 having a deployment structure similar to that commonly used for umbrellas. Deployable antenna 900 includes ribs 924 for holding electromagnetically reflective material 930 in a preferred shape to accomplish the objectives described herein. Ribs 924 may perform a function similar to the function of wires 624 described with respect to FIG. 6A. Ribs 924 may be configured to hold electromagnetically reflective material 930 in a preferred shape for reflecting signals to and from communication device 910.

FIG. 9B illustrates a side view of the deployable antenna 900, depicting additional components, such as stretchers 929, may be used to hold electromagnetically reflective material 930 and ribs 924 (not shown in FIG. 9B) in position when antenna 900 is deployed. In addition to holding communication device 910 in place, shaft 960 may also be used as a channel, rail, or guide for stretchers 929 similar to the operation of an umbrella deployment mechanism. In this way, the assembly may fold down along shaft 960 such that it has a roughly cylindrical shape of a relatively small diameter when it is in a stowed or un-deployed configuration.

FIG. 9C illustrates a side view of an alternative configuration of deployable antenna 900 of FIG. 9A. In FIG. 9C, rather than folding along shaft 960, the components of deployable antenna 900 fold and stow along boom 970. Boom 970 may be a cylindrical tube that the various components of deployable antenna 900, including shaft 960, fold and slide into boom 970 for purposes of storage and/or transport.

Figure 10B:
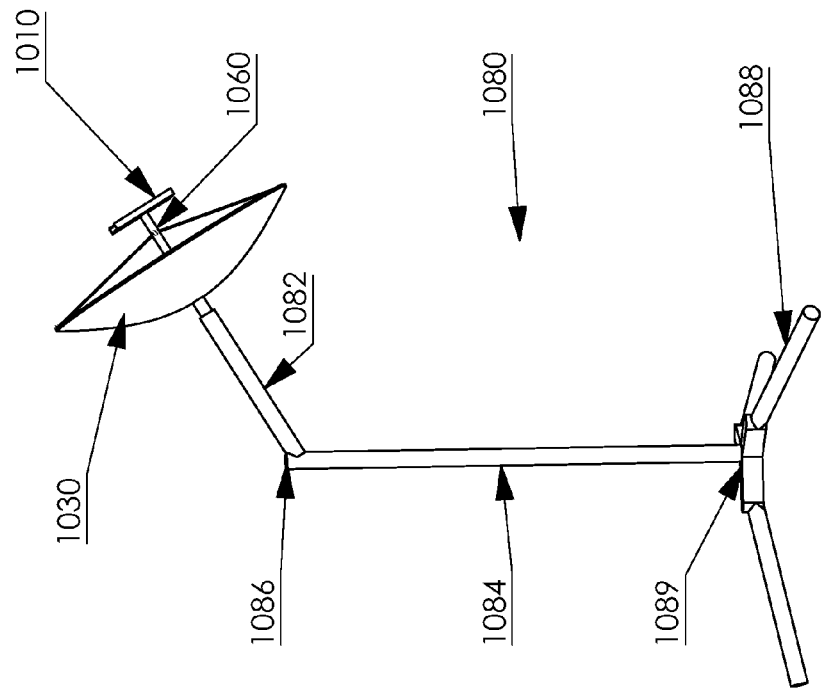
FIG. 10B illustrates the portable antenna in a deployed configuration.
Figure 10A:
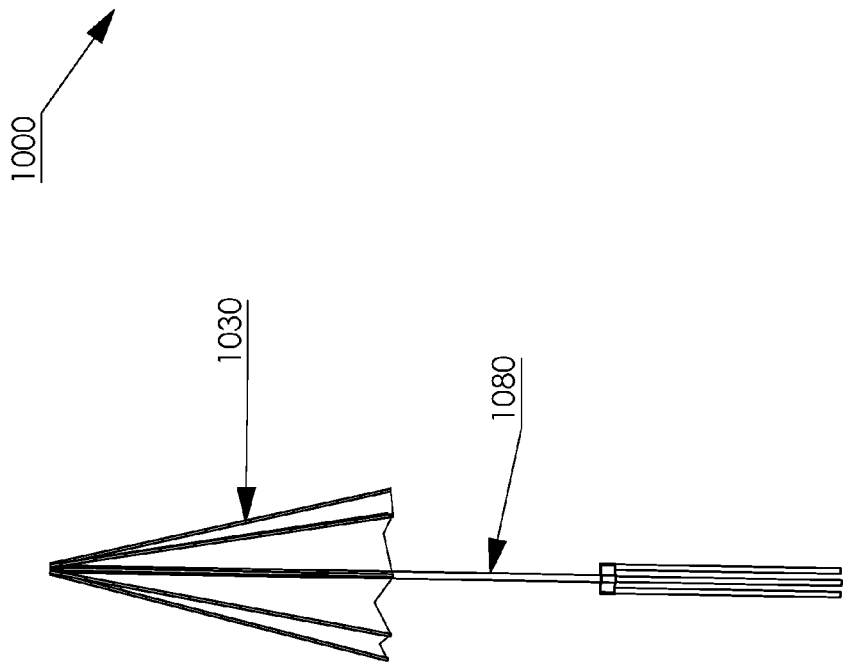
FIG. 10A illustrates a portable antenna in a stowed configuration.

FIG. 10A illustrates portable antenna 1000 in a stowed configuration. Portable antenna 1000 includes reflector 1030 and stand 1080. Reflector 1030 may be configured and/or operate in a manner similar to that described with respect to reflector of FIG. 5-FIG. 9, supra.

FIG. 10B illustrates portable antenna 1000 in a deployed position for use with communication device 1010. Stand 1080 includes arm 1082, arm 1084, joint 1086, legs 1088, and slide 1089. Legs 1088 are used to support portable antenna 1000 on a surface. Slide 1089 slides along arm 1084 to move legs 1088 from the stowed position illustrated in FIG. 10A to the deployed position illustrated in FIG. 10B and to hold legs 1088 in the deployed position. Slide 1089 may include a locking mechanism to hold it in place while portable antenna 1000 is in use. Using joint 1086, arm 1082 may be positioned with respect to arm 1084 in order to adjust portable antenna 1000 to a preferred elevation angle or altitude angle. Arms 1082 and 1084 may also be used in conjunction with joint 1086 to rotate portable antenna 1000 to different azimuths without moving legs 1088 or rotating them across the surface on which they are sitting. Reflector 1030 may deploy in an umbrella-like manner as described with respect to FIGS. 9A-9C.

FIG. 11A illustrates a perspective view of a corner reflecting antenna 1100 for use with a communication device 1110 in accordance with the techniques described herein. A conventional corner reflecting antenna 1100 normally relies on an antenna feed (shown as attached mobile device 1110) placed a selected distance away from the apex of two predominantly planar reflecting sheets 1123A, 1123B, which join together at an angle generally equal to or less than 180 degrees to form a double-reflecting surface. The double-reflective surface is achieved by using a electromagnetically reflective material on the surface of or in lieu of the two planar sheets 1123A, 1123B.

Antenna 1100 includes electromagnetically reflective material on the surface of or in lieu of the two planar sheets 1123A, 1123B, boom 1160, and post 1180. Antenna 1100 operates in a manner similar to that described with respect to the other examples herein but does so using a corner reflector design rather than a curved reflecting surface. A corner reflector configuration generally causes a signal received at the corner reflector to be reflected back toward the original source. Consequently, the signal strength in front of the antenna is increased. Electromagnetically reflective material may be any conductive material including a conductive fabric, a metallized fabric, a conductive plastic, a metallized film, a conductive screen, a conductive mesh, a conductive material laminated to a nonconductive material, or a combination thereof. Post 1180 can be driven into the ground or otherwise attached to a surface to hold antenna 1100 in a fixed position, at least temporarily. In some cases it may be beneficial to raise antenna 1100, or any of the other antennas described herein, several wavelengths above the ground. For example, for GSM 850 MHz voice calls, 5 wavelengths is a distance of 71.6 inches above the ground and is preferred over smaller distances over the ground.

FIG. 11B illustrates a top view of corner reflecting antenna 1100 of FIG. 11A.

FIG. 12A illustrates a perspective view of a corner reflecting antenna 1200 having flexible reflecting surfaces 1223A, 1223B in a deployed configuration. Corner reflecting antenna 1200 includes support arms 1224A-1224D attached to post 1280. Electromagnetically reflective material comprising the flexible reflecting surfaces 1223A, 1223B is held in place to form corner reflecting antenna 1200. A communication device (not picture in FIG. 12A) is held in place relative to the corner antenna 1200 in a manner similar to that illustrated and described with respect to FIGS. 11A and 11B. Support arms 1224A-1224D are attached to post 1280 and held in place relative to post 1280 and each other using pivots 1228.

FIG. 12B illustrates the corner reflecting antenna in a partially dismantled configuration. As illustrated in FIG., pivots 1228 also enable arms 1224(A)-1224(D) to be rotated into a stowed position such that they are parallel with post 1280. Reflective material comprising the flexible reflecting surfaces 1223A, 1233B may be removed from arms 1224A-1224D before the arms 1224A-1224D are folded in or, as illustrated in FIG. 12B, reflective material comprising the flexible reflecting surfaces 1223A, 1233B may also remain attached and fold down with arms 1224A-1224B.

FIG. 12C illustrates corner reflecting antenna 1200 of FIG. 12A with a storage container 1290. When arms 1224A-1224B have been folded into parallel, or near parallel, positions with post 1280, the entire assembly may be slid into container 1290 for convenient storage or transport. Post 1280 may not be attached to container 1290 or may be attached to container 1290 using a rail, guide, or sliding mechanism that allows post 1280 and the other components to be easily slid into container 1290. Container 1290 may also include a lid or cap to further protect corner reflecting antenna 1200 when stowed. Arms 1224A-1224B may be attached using a spring loaded hinge or pivot such that they automatically pivot into the operational or deployed position when post 1280 is removed from container 1290.

FIG. 13A illustrates a perspective view of a corner reflecting antenna 1300. Corner reflecting antenna 1300 is similar to corner reflecting antenna 1200 of FIG. 12A and includes a different type of support feature for supporting electromagnetically reflective material comprising the flexible reflecting surfaces 1223A, 1223B. As with previous examples, reflective material reflects electromagnetic signals toward a wireless communication device (not shown). Electromagnetically reflective material may comprise a conductive fabric, a metallized fabric, a conductive plastic, a metallized film, a conductive screen, a conductive mesh, a conductive material attached to a nonconductive material, or a combination thereof. Electromagnetically reflective material comprising the flexible reflecting surfaces 1223A, 1223B is held in place by supports 1324A-1324D, which are attached to mast 1380. As illustrated in FIG. 13A, supports 1324A-1324D extend out from mast 1380 when they are in a relaxed or deployed state. However, supports 1324A-1324D are made of one or more flexible materials that can be rolled up or rolled around mast 1380 as illustrated in FIG. 13B. In one example, supports 1324A-1324D are made of a flexible metal tape or strip having a shape that tends to return it to the straight position illustrated in FIG. 13A. In one example, supports 1324A-1324D have a bowed cross section similar to a metallic measuring tape. In some cases, supports 1324A-1324D may each be comprised of two bowed or concave metal tapes having their concaves facing in opposite directions in order to provide further stiffness in two orthogonal axes. Other materials such as fiberglass and carbon composites are possible.

Electromagnetically reflective material comprising the flexible reflecting surfaces 1223A, 1223B is also flexible and can be rolled up around mast 1380 along with supports 1324A-1324D. This allows corner reflecting antenna to be easily stored in container 1390 for storage and/or transport. In some cases, one or more fasteners, clips, tabs, bands, or hook and loop fasteners may be used to hold electromagnetically reflective material comprising the flexible reflecting surfaces 1223A, 1233B and/or supports 1324A-1324D in the rolled up configuration illustrated in FIG. 13B. When released, supports 1324A-1324D may spring out or relax into the position illustrated in FIG. 13A.

FIG. 13C illustrates further detail of mast 1380 of FIGS. 13A and 13B. Mast 1380 may include recesses 1382 around its circumference for supports 1324A-1324D. When supports 1324A-1324D are wrapped around mast 1380 as illustrated in FIG. 13B, they sit in recesses 1382 in order to be flush, at least partially, with the surface of mast 1380. This enables the rolled up assembly to be more compact, reduces the needed size of container 1390, and reduces the likelihood of supports 1324A-1324D catching on an edge of container 1390 when corner reflecting antenna 1320 is inserted into or removed from container 1390.

Figure 14B:
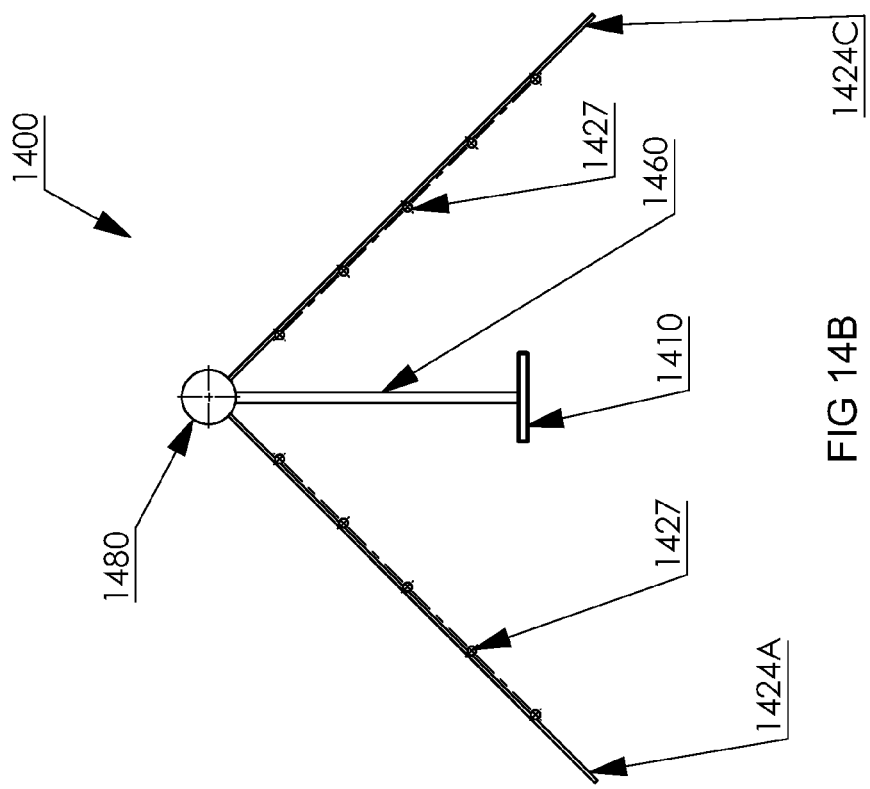
Figure 14A:
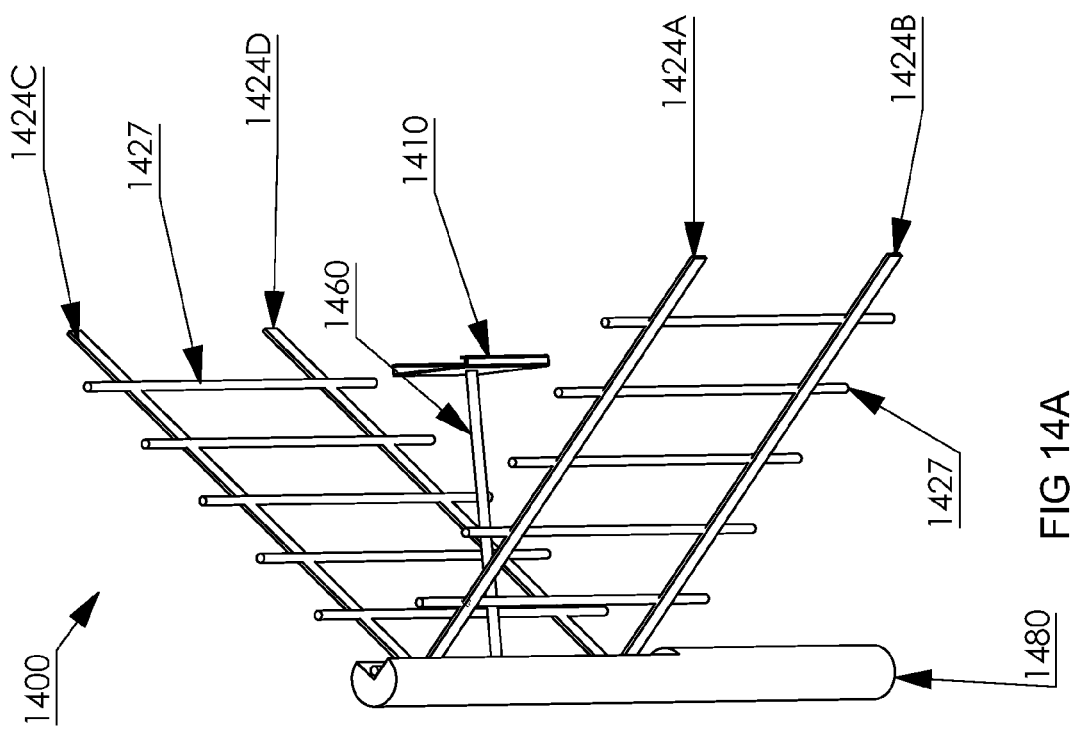
FIG. 14A illustrates a perspective view of a wire-based corner reflector.

FIG. 14A illustrates a perspective view of a wire-based corner reflector antenna 1400. Wire-based corner reflector antenna 1400 operates in a manner similar to that described with respect to FIGS. 11A, 12A, and 13A, but utilizes resonant wires 1427 to reflect signals toward communication device 1410 rather than sheets of conductive materials, meshes, or screens. Resonant wires 1427 are attached to and held in position by arms 1424A-1424D. Communication device 1410 is held at a preferred position near or at a focal point by boom 1460. Boom 1460 and arms 1424A-1424D are attached to support 1480. Resonant wires 1427 have lengths that may be chosen based on a frequency or a frequency range of the signals that will be reflected using wire-based corner reflector 1430. The direction of and/or spacing between wires 1427 may also be chosen to tune the gain, efficiency, frequency range, and/or bandwidth of corner reflector 1430.

FIG. 14B illustrates a top view of wire-based corner reflector 1430.

Wires 1427 will typically be predominantly parallel to the electric field vector of the signal being received (usually vertical in the case of long distance communications) or parallel to another surface which reflects electromagnetic energy with high efficiency, which is not necessarily a planar conductor. A non-planar reflecting surface, like that illustrated in FIG. 14, may provide better aerodynamic efficiency (reduce wind drag or loading). It may also allow the user to better observe and/or interact with the mobile device while it is in place in the focal region. The ability to observe the mobile device screen may enable the user to rotate, point, or sight the antenna towards the opposite terminal by observing the change in received signal strength on the device as the antenna is rotated around in the azimuth plane and/or follow directions displayed on the screen by an application.

Figure 14D:
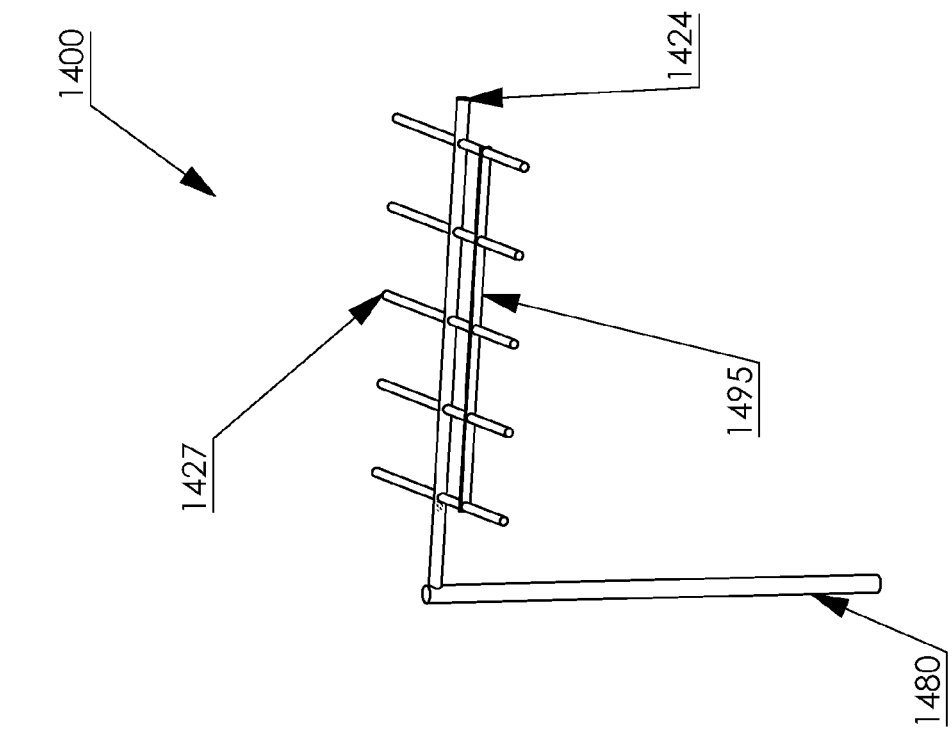
FIG. 14D illustrates stowing of the wire-based corner reflector.
Figure 14C:
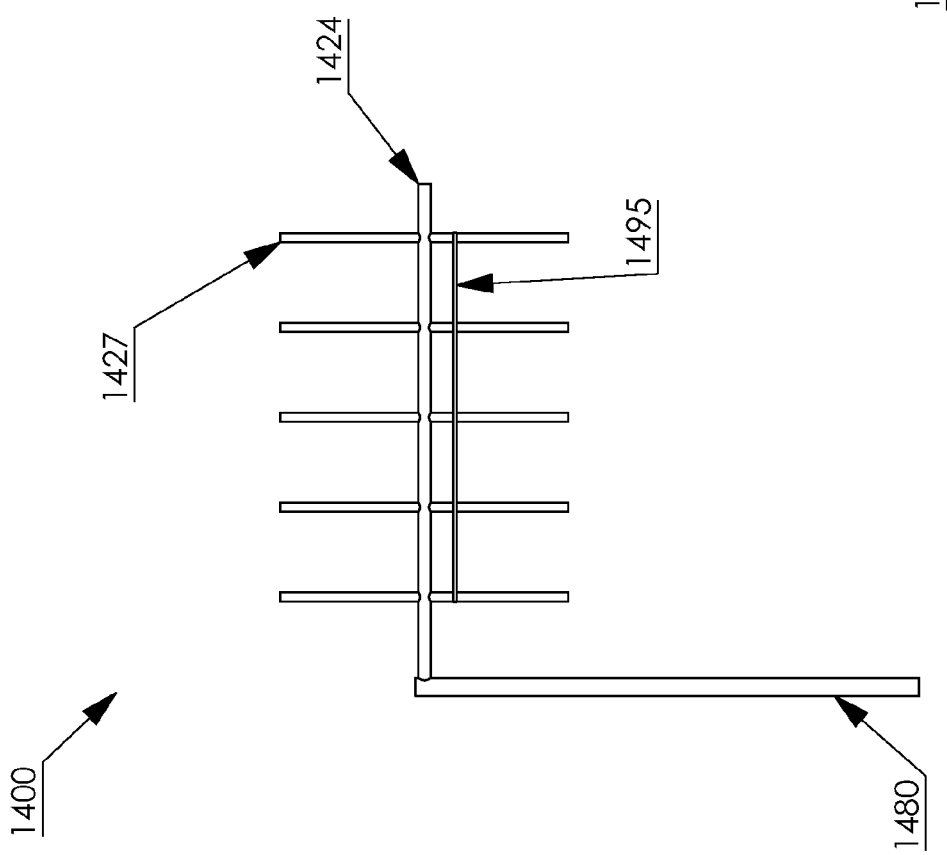
FIG. 14C illustrates a side view of the wire-based corner reflector in a deployed position.

FIG. 14C illustrates a side view of one side of alternative configuration of wire-based corner reflector antenna 1400 of FIG. 14A. The other side and boom 1460 are not included in FIG. 14C for purposes of simplifying the illustration. Resonant wires 1427 are attached to arm 1424 in a manner that allows them to pivot with respect to arm 1424. Mechanical linkage 1495 is also attached to each of resonant wires 1427.

As illustrated in FIG. 14D, mechanical linkage 1495 causes all of resonant wires 1427 to pivot in unison when one of resonant wires 1427 is moved. In this way, wire-based corner reflector 1430 can more easily and/or quickly be deployed or stowed because a user does not need to position each element individually. Wire-based corner reflector 1430 may be folded into a stowed position or into a storage configuration such that some or all of the components are in approximately parallel positions. This allows wire-based corner reflector 1430 to be stored or carried in a tube or similar container of relatively small diameter or cross section.

A software application, or app, may also be used with one or more of the deployable antennas or reflectors described herein. The purpose of the software application is to assist a user in identifying a location for making a reliable phone call or data connection while using a stow-able or deployable antenna. The software application may be stored in one or more memory devices of communication device 510 and be executed by one or more computer processors of communication device 510. The software application may assist the user in sighting, aiming, or pointing the antenna or reflector toward a communication tower or other communication source. The software application may contain a map of the user's position within some radius. The position may be determined using a GPS device of the communication device. Orientation may be determined by reading a compass or a magnetometer of the mobile communication device. The map may show the direction and distance of communication towers or 'opposite terminals' which can be accessed using communication device 510. The user may use some or all of this information to decide which direction to aim the antenna or to adjust the antenna.

The software may also show the intensity of wireless signal strength based on the local terrain, distance to a tower, transmit power, and/or the gain of the deployable antenna. This map may also guide the user to a point where a reliable phone call can be made. Alternatively, instead of displaying a continuum of signal strength across the map, the map may highlight communication hotspots that have been pre-calculated and stored in the software or elsewhere in the mobile device. In one example, popular hiking and/or mountain biking trails could be pre-analyzed at certain discrete points along the trails. When a particular location has a signal strength above a certain threshold level that location may be stored as a hotspot. Hotspots may be further distinguished by frequency, communication protocol, and/or carrier. The software may also calculate expected signal strengths at the user terminal, and at the opposite terminal, based on the user coordinates, the opposite terminal's coordinates, the user antenna gain, transmit power, and/or the opposite terminal antenna gain.

Other examples may also include other apparatuses, methods, systems with various components, and non-transitory machine-readable storage media storing instructions that, when executed by one or more computer processors, direct the one or more computer processors to perform the methods, variations of the methods, or other operations described herein. While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

The methods, apparatuses, systems, and components described above are meant to exemplify some types of possibilities. In no way should the aforementioned examples limit the scope of the invention, as they are only exemplary embodiments.

The foregoing disclosure has been presented for purposes of illustration and description. Other modifications and variations may be possible in view of the above teachings. The examples described in the foregoing disclosure were chosen to explain the principles of the concept and its practical application to enable others skilled in the art to best utilize the invention. It is intended that the claims be construed to include other alternative embodiments of the invention except as limited by the prior art.

The phrases "in some embodiments," "according to some embodiments," "in the embodiments shown," "in other embodiments," "in some examples," "in some cases," "in some situations," "in one configuration," "in another configuration" and the like generally mean that the particular feature, structure, or characteristic following the phrase is included in at least one embodiment of the present invention and/or may be included in more than one embodiment of the present invention. In addition, such phrases do not necessarily refer to the same embodiments or different embodiments.

What is claimed is:

1. A portable antenna for wireless communication, the portable antenna comprising:
   an electromagnetically reflective material;
   a first mechanical structure supporting preferred shape of the electromagnetically reflective material when in deployed position;
   a second mechanical structure attached to at least one point on the preferred shape and adjustable to hold a mobile wireless communication device at a preferred position relative to the preferred shape;
   wherein the mobile wireless communication device comprises:
   one or more computer processors; and
   a memory storing computer executable instructions which, direct the one or more computer processors to
   determine a location of the wireless communication device;
   display a geographical map including the determined location of the wireless communication device;
   display a location of a communication tower on the map; and
   display a signal strength indicator associated with an identified area on the map.

2. The portable antenna as claimed in claim 1, wherein the identified area is a preferred area to make a call using the wireless communication device.

3. The portable antenna as claimed in claim 1, wherein the executable instructions further direct the one or more computer processors to:
   determine a directional orientation of the wireless communication device; and
   display a direction to point a portable directional antenna based on the determined directional orientation.

4. The portable antenna as claimed in claim 3, wherein the executable instructions further direct the one or more computer processors to determine a directional orientation of the wireless communication device by reading a compass of the wireless communication device.

5. The portable antenna as claimed in claim 1, wherein the executable instructions further direct the one or more computer processors to periodically update and display a measured wireless communication signal strength.

6. The portable antenna as claimed in claim 1, wherein the preferred shape comprises a parabolic curve in at least one axis.

7. The portable antenna as claimed in claim 1, wherein the preferred shape comprises a elliptical curve in at least one axis.

8. The portable antenna as claimed in claim 1, wherein the preferred shape comprises a hyperbolic curve in at least one axis.

9. The portable antenna as claimed in claim 1, wherein the preferred shape comprises a corner reflector.

10. The portable antenna as claimed in claim 1, wherein the mobile wireless communication device comprises a mobile phone.

11. The portable antenna as claimed in claim 10, wherein the mobile wireless communication device comprises a mobile phone used as a hotspot.

12. The portable antenna as claimed in claim 1, wherein the mobile wireless communication device comprises a dedicated hotspot.

13. The portable antenna as claimed in claim 1, wherein the preferred position is determined by adjusting the second mechanical structure for a maximum received signal strength indicator.

14. The portable antenna as claimed in claim 1 further comprising;
a solar panel;
wherein the solar panel is applied on a first surface of the electromagnetic material.

15. The portable antenna as claimed in claim 1, further comprising:
a first material;
wherein the electromagnetically reflective material is applied on a first surface of the first material.

16. The portable antenna as claimed in claim 15, further comprising;
a solar panel;
wherein the solar panel is applied on a second surface of the first material.

* * * * *